US008678523B2

(12) United States Patent
Carr

(10) Patent No.: US 8,678,523 B2
(45) Date of Patent: Mar. 25, 2014

(54) UNIVERSAL TELEVISION LIFT WITH ENCLOSURE

(76) Inventor: James E. Carr, Irvine, CA (US)

( * ) Notice: Subject to any disclaimer, the term of this patent is extended or adjusted under 35 U.S.C. 154(b) by 0 days.

(21) Appl. No.: 13/365,191

(22) Filed: Feb. 2, 2012

(65) Prior Publication Data

US 2012/0194750 A1    Aug. 2, 2012

Related U.S. Application Data

(60) Provisional application No. 61/438,946, filed on Feb. 2, 2011.

(51) Int. Cl.
*A47B 51/00*    (2006.01)
(52) U.S. Cl.
USPC ............................ 312/7.2; 312/306; 312/312
(58) Field of Classification Search
USPC .......................... 312/312, 7.2, 306, 296, 204, 312/319.5–319.8, 21–23, 234, 247, 196, 312/319.4; 248/161, 201, 918, 919, 219.2; 108/147, 147.19, 50.02, 26, 38
See application file for complete search history.

(56) References Cited

U.S. PATENT DOCUMENTS

| 1,156,885 | A | * | 10/1915 | Caine | 248/218.4 |
|---|---|---|---|---|---|
| 2,949,314 | A | * | 8/1960 | Strohmaier | 280/654 |
| 3,311,437 | A | * | 3/1967 | Peebles | 312/296 |
| 3,585,991 | A | | 6/1971 | Balamuth | |
| 4,504,867 | A | | 3/1985 | Keller | |
| 4,650,197 | A | * | 3/1987 | Norris | 280/5.24 |
| 5,124,805 | A | | 6/1992 | Chung et al. | |
| 5,165,126 | A | | 11/1992 | Jones | |
| 5,410,373 | A | | 4/1995 | Sagues et al. | |
| 5,501,420 | A | | 3/1996 | Watt et al. | |
| 5,564,808 | A | * | 10/1996 | Gipson et al. | 312/405 |

(Continued)

FOREIGN PATENT DOCUMENTS

| JP | 02-061263 | 3/1990 |
|---|---|---|
| JP | 02-285171 | 11/1990 |

(Continued)

OTHER PUBLICATIONS

Web pages http://www.firgelliauto.com/product_info.php?cPath=108&products_id=184 with specification sheet printed Feb. 2, 2012 for Firgelli Auto, TV Lift mechanism manual, and installation instructions Mar. 10, 2009 (12 sheets).

(Continued)

*Primary Examiner* — Janet M Wilkens
(74) *Attorney, Agent, or Firm* — Christie, Parker & Hale, LLP

(57) ABSTRACT

A universal television lift and enclosure suitable for outdoor use. A television lift assembly includes an enclosure including a housing having an opening, and a cover engageable with the housing to seal the opening; and a lift device including a first portion mounted in the enclosure, and a movable portion including a first end movably coupled to the first portion, an attachment portion configured to removably attach a television thereto, and a second end, the cover being attached to the second end, and the movable portion of the lift device being movable between a first position within the housing and in which the cover seals the opening for storing the television in the weatherproof enclosure, and a second position outside the housing for supporting the television in a viewable position.

24 Claims, 19 Drawing Sheets

(56) References Cited

U.S. PATENT DOCUMENTS

| | | | |
|---|---|---|---|
| 5,598,789 A * | 2/1997 | Jonker | 108/147 |
| 5,782,544 A * | 7/1998 | Johnson, Sr. | 312/7.2 |
| 6,427,258 B1 | 8/2002 | Gooley | |
| 6,474,410 B1 | 11/2002 | Minich et al. | |
| 6,754,916 B1 | 6/2004 | Cox | |
| 7,044,423 B2 | 5/2006 | Bober et al. | |
| 7,218,746 B2 | 5/2007 | Schmidt et al. | |
| 7,262,519 B1 | 8/2007 | Krämer et al. | |
| 7,334,766 B2 * | 2/2008 | Ligertwood | 248/292.13 |
| 7,410,226 B1 * | 8/2008 | Meskan | 312/7.2 |
| D598,458 S * | 8/2009 | Li | D14/451 |
| 7,806,490 B1 * | 10/2010 | Buehl | 312/312 |
| 8,177,174 B2 * | 5/2012 | Griepentrog | 248/125.2 |
| 2003/0038222 A1 * | 2/2003 | Holmes | 248/475.1 |
| 2003/0088912 A1 | 5/2003 | Lauter et al. | |
| 2003/0205951 A1 * | 11/2003 | Lambert | 312/7.2 |
| 2004/0068786 A1 | 4/2004 | Lauter et al. | |
| 2004/0068787 A1 | 4/2004 | Lauter et al. | |
| 2004/0084579 A1 * | 5/2004 | Lee et al. | 248/125.1 |
| 2004/0221775 A1 | 11/2004 | Okninski | |
| 2004/0231042 A1 | 11/2004 | Carter | |
| 2005/0275323 A1 | 12/2005 | Wilhelm | |
| 2006/0065800 A1 * | 3/2006 | Bremmon | 248/274.1 |
| 2006/0066188 A1 * | 3/2006 | Crawford | 312/247 |
| 2007/0035671 A1 | 2/2007 | Ryu et al. | |
| 2007/0046843 A1 | 3/2007 | Maxson | |
| 2007/0169259 A1 | 7/2007 | Macey et al. | |
| 2007/0188056 A1 * | 8/2007 | Chang | 312/7.2 |
| 2007/0240257 A1 | 10/2007 | Ignarra et al. | |
| 2007/0252919 A1 | 11/2007 | McGreevy | |
| 2008/0078897 A1 | 4/2008 | Smith | |
| 2009/0218174 A1 | 9/2009 | Gardner | |
| 2011/0012489 A1 | 1/2011 | Shen et al. | |

FOREIGN PATENT DOCUMENTS

| | | | |
|---|---|---|---|
| JP | 2002235480 | * | 8/2002 |
| WO | WO 03/001798 A1 | | 1/2003 |
| WO | WO 03/039365 A2 | | 5/2003 |
| WO | 2013/034876 | * | 3/2013 |

OTHER PUBLICATIONS

Premier Mounts, The original holding company, Installation Instructions for LPFM3752 Universal Low Profile Flat Mount for 37" to 52" Flat Panels, 2009 (14 pgs.).

International Search Report for International Application No. PCT/US12/23687, filed Feb. 2, 2012, International Search Report dated May 23, 2012 and mailed Jun. 6, 2012 (2 pgs.).

Written Opinion of the International Searching Authority for International Application No. PCT/US12/23687, filed Feb. 2, 2012, Written Opinion of the International Searching Authority dated May 24, 2012 and mailed Jun. 6, 2012 (4 pgs.).

* cited by examiner

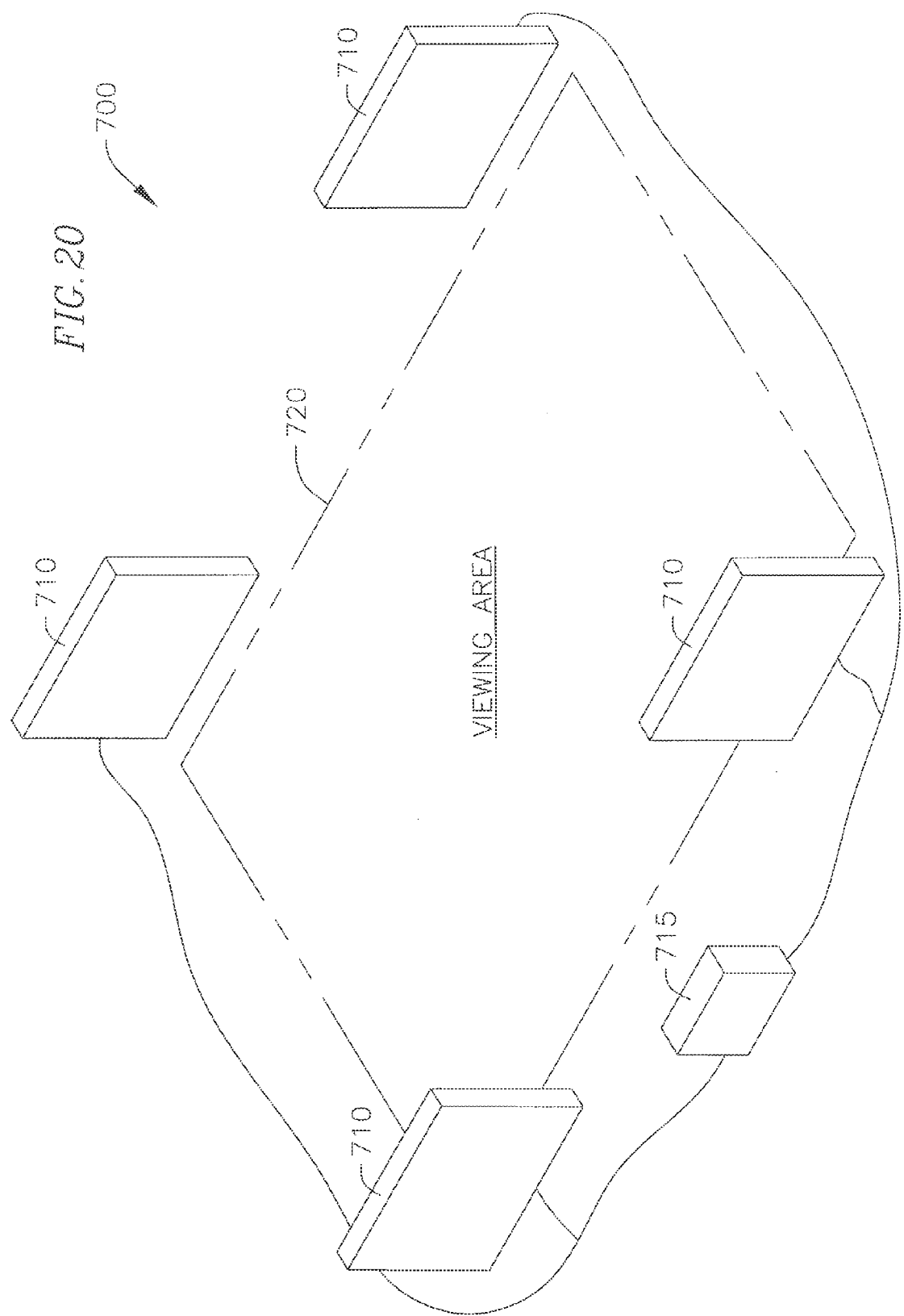

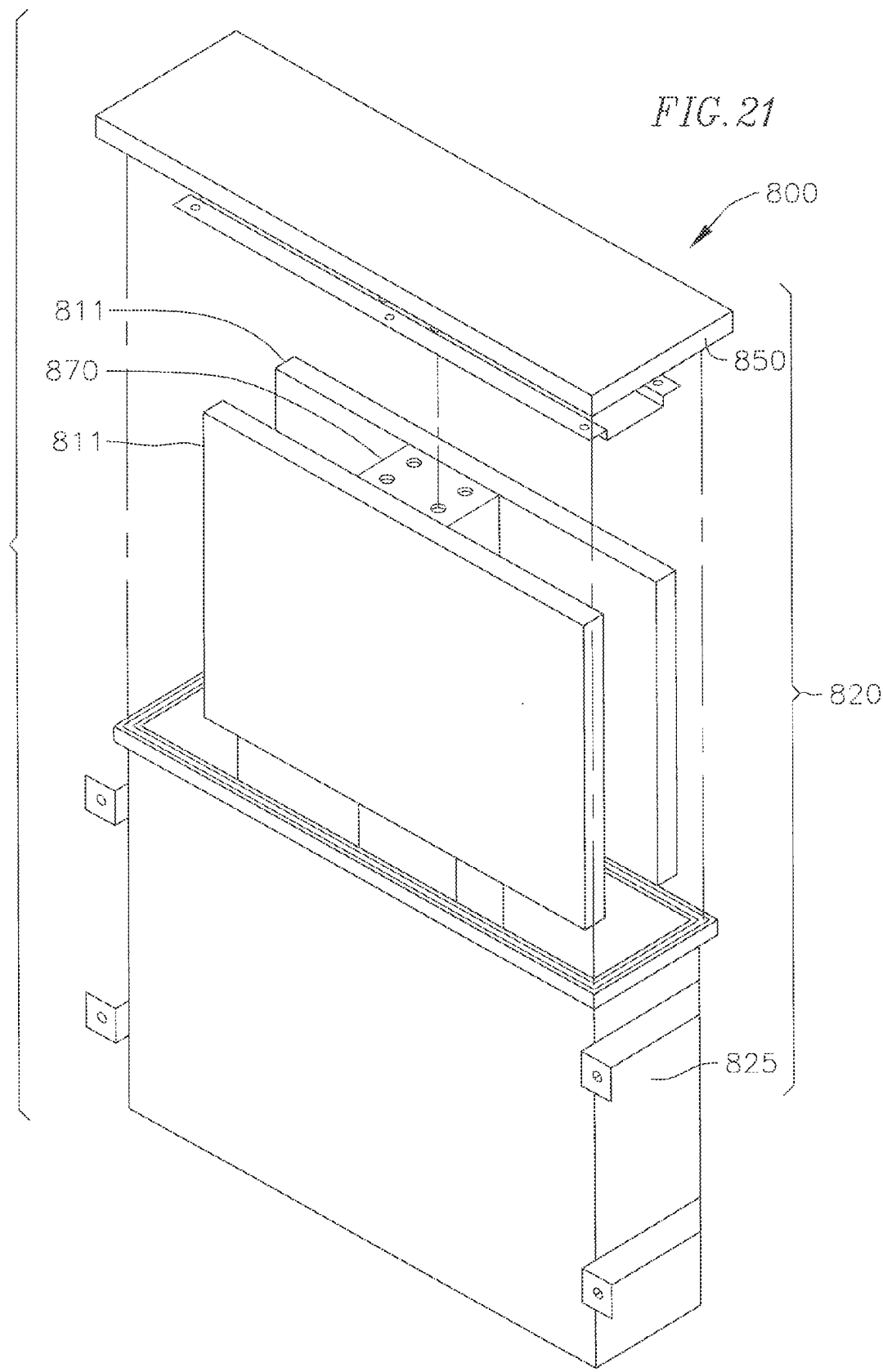

UNIVERSAL TELEVISION LIFT WITH ENCLOSURE

CROSS-REFERENCE TO RELATED APPLICATION

This application claims priority to and the benefit of U.S. Provisional Application No. 61/438,946, filed on Feb. 2, 2011 in the United States Patent and Trademark Office, the entire content of which is incorporated herein by reference.

FIELD

Aspects of embodiments of the present invention relate to a television lift and enclosure, and more particularly to a weatherproof television lift and enclosure suitable for outdoor use.

BACKGROUND

Vast improvements have been made in recent years in the field of televisions and video display panels. For example, flat-screen display panels, such as LCD, LED, and plasma-type, typically have high picture quality and a small thickness, even in large panels. Also, such video display panels may be used together with video and multi-media players and computers. Additionally, with continued improvements being made in the field, flat-screen televisions and other video display panels have become very affordable. As such, many households now have several television and video displays panels and enjoy the ability to view them in various rooms.

In addition to being able to enjoy televisions and video display panels indoors, many people often wish to view a television or video display panel outdoors, such as at a patio, a barbeque area, a deck, a pool area, or other outdoor area around a home, or at other outdoor environments, such as restaurants, taverns, hotels, conference centers, sports facilities, or schools, for example. Often, for outdoor events, televisions and video display panels are moved from indoors to outdoors for the event, and then are moved back indoors after the event for safety and protection from the elements. However, this is time-consuming and may be impractical, especially where a large-screen television or video display panel is desired. Moreover, it may be desired or required, especially in milder climates, that a television or video display panel be used outdoors frequently. As such, there is a need for a weatherproof television enclosure for outdoor use, so that a television or video display panel can be quickly and easily set up for viewing and stored for protection when not in use.

SUMMARY

According to an aspect of embodiments of the present invention, a television lift and weatherproof enclosure are configured for outdoor use and can be quickly and easily set up for viewing and stored for protection from the environment when not in use. According to another aspect of the present invention, a television lift and enclosure assembly is configured as a self-sufficient, or plug-and-play, unit that is self-powered. According to another aspect of the present invention, a television is not enclosed (e.g., in a waterproof or weatherproof casing) and a screen of the television is not covered (e.g., with a waterproof or weatherproof cover) when it is in a viewing position and, as such, viewing is not obstructed and a cooling device is not needed. According to another aspect of the present invention, the television lift assembly is universal in that it is configured to removably mount any of a plurality of televisions having different sizes. According to another aspect of the present invention, a television lift and enclosure assembly is configured for wireless operation. According to still another aspect of the present invention, a television lift and enclosure assembly includes a safety device for detecting an obstruction to a moving component of the assembly and stopping or reversing a motion of the moving component in response to detection of an obstruction. According to still another aspect of the present invention, a television lift and enclosure assembly is configured to be mounted on a structure, such as an exterior wall. According to still another aspect of the present invention, a television lift and enclosure assembly is connected to a trolley to movably support the enclosure assembly. According to another aspect of the present invention, an enclosure for a television and lift assembly may include a display portion (e.g., a digital display portion) on an exterior of the enclosure. According to another aspect of the present invention, a plurality of television lift and enclosure assemblies may be configured for concurrent operation via a shared control system.

According to one embodiment of the present invention, a television lift assembly includes an enclosure including a housing having an opening, and a cover engageable with the housing to seal the opening; and a lift device including a first portion mounted in the enclosure, and a movable portion including a first end movably coupled to the first portion, an attachment portion configured to removably attach a television thereto, and a second end, the cover being attached to the second end, and the movable portion of the lift device being movable between a first position within the housing and in which the cover seals the opening and a second position outside the housing.

In one embodiment, the television lift assembly further includes an adapter plate attached to the attachment portion of the lift device and configured to removably attach any of a plurality of televisions having different sizes to the attachment portion. The adapter plate may have a plurality of attachment holes spaced apart from one another in a vertical direction for adjusting a position of the television relative to the attachment portion in the vertical direction.

In one embodiment, the television lift assembly further includes a mounting plate connected to the adapter plate and configured to removably attach the television thereto, wherein a position of the mounting plate relative to the attachment portion is adjustable in a horizontal direction.

In one embodiment, the housing includes a flange surrounding and extending away from the opening. In one embodiment, the television lift assembly further includes a gasket attached to one of the flange or the cover, and the gasket contacts the other of the flange or the cover to weatherproof the enclosure when the movable portion of the lift device is in the first position. The cover may include a flange around a periphery thereof, the flange of the cover surrounding the flange of the housing when the cover is engaged with the housing.

The housing may include a mounting device configured to mount the housing to a structure. In one embodiment, the television lift assembly further includes a trolley connected to and movably supporting the housing.

The television lift assembly may further include a safety device configured to at least one of stop or reverse a direction of movement of the movable portion of the lift device. In one embodiment, the safety device includes a sensor configured to detect an obstruction between the cover and the housing, and the safety device is configured to stop or reverse the direction of movement of the movable portion of the lift device when the sensor detects the obstruction.

In one embodiment, the housing includes a pair of first walls that are substantially parallel to each other, and a pair of second walls connecting the first walls and being substantially parallel to each other. In another embodiment, the housing includes a pair of first walls that are substantially parallel to each other, and a pair of arcuate second walls connecting the first walls.

The television lift assembly may further include a graphic display on an exterior surface of the housing.

According to another embodiment of the present invention, a media apparatus includes an enclosure including a housing having an opening, and a cover engageable with the housing to seal the opening; a lift device including a first portion mounted in the enclosure, and a movable portion including a first end movably coupled to the first portion, an attachment portion, and a second end, the cover being attached to the second end; and a television removably attached to the attachment portion of the lift device, wherein the movable portion of the lift device is movable between a first position in which the television is inside the housing and the cover seals the opening and a second position in which the television is outside the housing.

In one embodiment, the media apparatus further includes an adapter plate attached to the attachment portion of the lift device and configured to removably attach any of a plurality of televisions having different sizes to the attachment portion. The adapter plate may have a plurality of attachment holes spaced apart from one another in a vertical direction for adjusting a position of the television relative to the attachment portion in the vertical direction.

In one embodiment, the media apparatus further includes a mounting plate connected to the attachment portion, the television being removably attached to the mounting plate, wherein a vertical centerline of the mounting plate is offset to one side in a horizontal direction relative to a vertical centerline of the lift device.

In one embodiment, the media apparatus further includes a gasket attached to one of the housing or the cover, and the gasket contacts the other of the housing or the cover to weatherproof the enclosure when the movable portion of the lift device is in the first position.

The media apparatus may further include a safety device configured to at least one of stop or reverse a direction of movement of the movable portion of the lift device. The safety device may include a sensor configured to detect an obstruction between the cover and the housing, and the safety device may be configured to stop or reverse the direction of movement of the movable portion of the lift device when the sensor detects the obstruction.

The media apparatus may further include a media player mounted to the movable portion of the lift device, the media player being movable together with the movable portion of the lift device between a position inside the housing and another position outside the housing. In one embodiment, the media apparatus further includes a weatherproof audio speaker integrated on the housing.

In one embodiment, the television is not substantially enclosed when the movable portion of the lift device is in the second position. In one embodiment, a screen of the television is not covered when the movable portion of the lift device is in the second position.

In one embodiment, the lift device is operable via a remote control device. The television may be operable via the remote control device.

Other features and advantages of embodiments of the present invention will become apparent from the following detailed description, taken in conjunction with the accompanying drawings which illustrate, by way of example, features and aspects of exemplary embodiments of the present invention.

BRIEF DESCRIPTION OF THE DRAWINGS

The above and other features, aspects, and advantages of the present invention will become better understood with regard to the following description, appended claims, and accompanying drawings where:

FIG. 20 is a schematic view of a media system according to another embodiment of the present invention; and FIG. 21 is a schematic view of a media apparatus according to another embodiment of the present invention.

DETAILED DESCRIPTION

Figure 1:
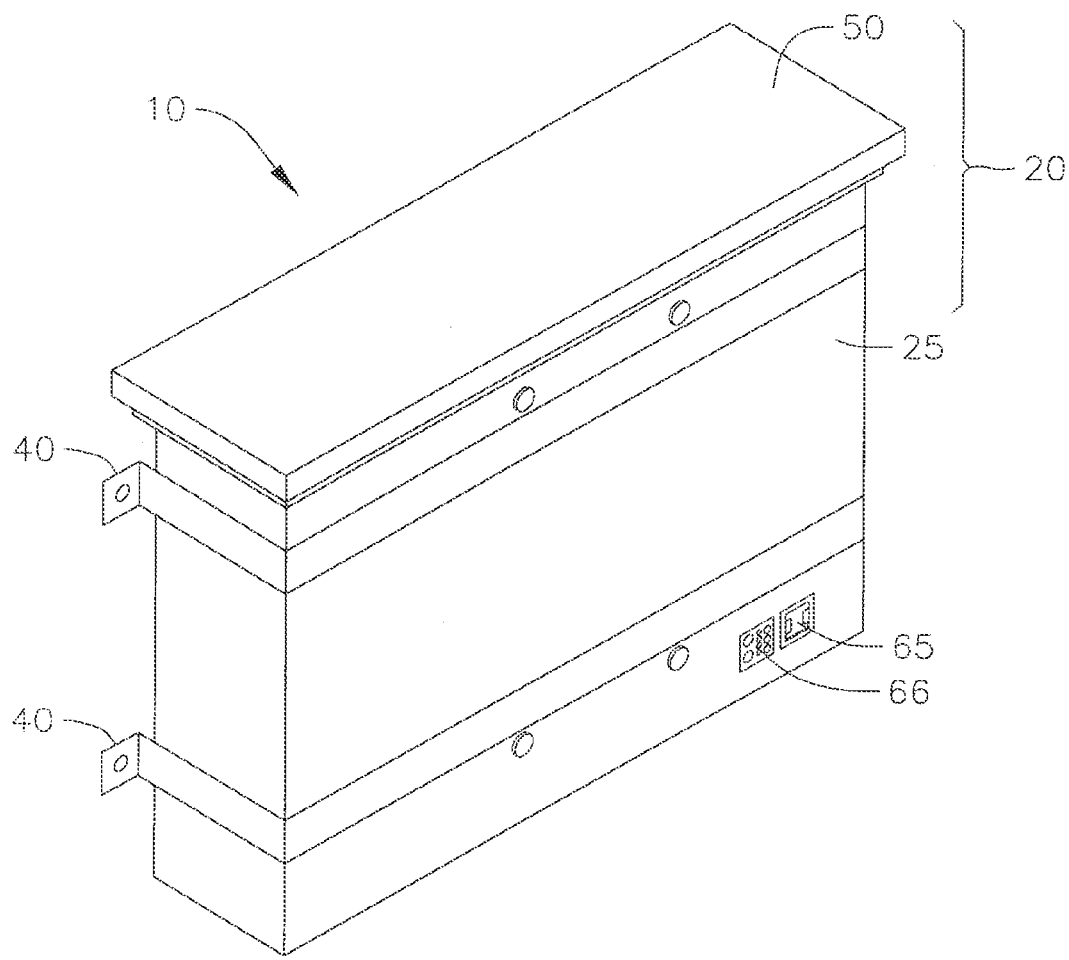
FIG. 1 is a rear perspective view of a media apparatus according to an embodiment of the present invention, the media apparatus being shown in a storage position.

In the following detailed description, certain exemplary embodiments of the present invention are shown and described, by way of illustration. As those skilled in the art would recognize, the described exemplary embodiments may be modified in various ways without departing from the spirit and scope of the present invention. Accordingly, the drawings and description are to be regarded as illustrative in nature, rather than restrictive. Further, terms such as "upper," "lower," "top," "bottom," "upward," and "downward" are used herein for the purpose of more clearly describing the location and/or orientation of components or features relative to others, as shown in the drawings, for example. However, the use of such terms is not intended or to be regarded as limiting the use of the invention to any particular position or orientation.

Figure 2:
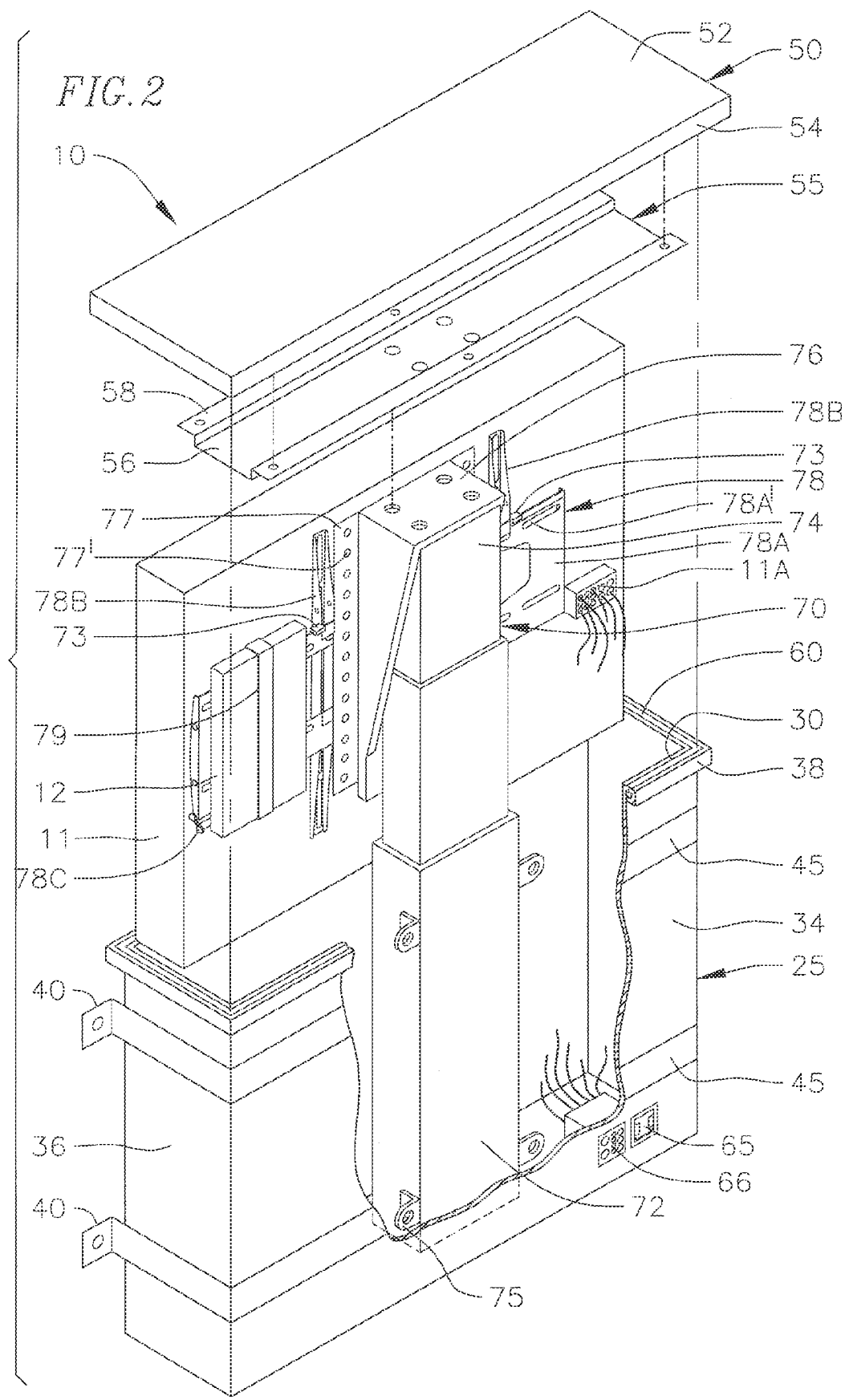
FIG. 2 is a partially exploded rear perspective view of the media apparatus of FIG. 1, the media apparatus being shown in a viewing position.
Figure 3:
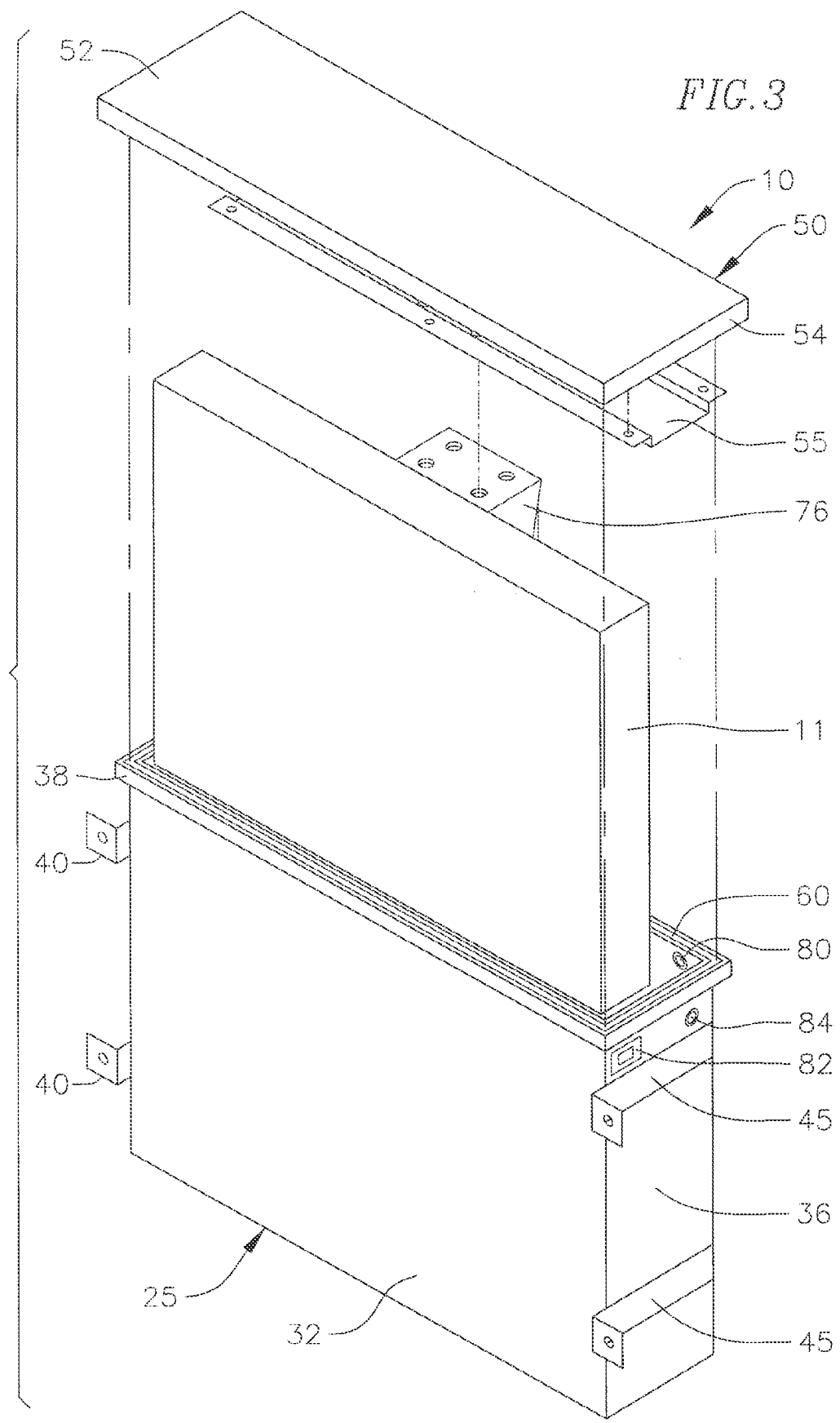
FIG. 3 is a partially exploded front perspective view of the media apparatus of FIG. 1, the media apparatus being shown in the viewing position.

With reference to FIGS. 1-3, a media apparatus 10 according to one exemplary embodiment of the present invention includes a television 11, an enclosure 20, and a lift device 70. The media apparatus 10 is configured to house the television 11 in the weatherproof enclosure 20 in a storage position (see FIG. 1) when the television 11 is not being viewed, and lift the television 11 out from the enclosure 20 to a viewing position (see FIG. 2) in which the television 11 may be viewed.

The television 11 may be a flat-screen television, such as an LCD, LED, or plasma-type television. Further, the television 11 may have any suitable size, such as, but not limited to, a flat-screen television of up to 60 inches. Further, the enclosure 20 and the lift device 70 may be designed or selected in accordance with the desired size of the television 11. Additionally, the term "television," as used herein, is intended to include televisions and other video display devices, screens, monitors, and similar devices for displaying broadcasts, media, video presentations, and/or other information.

The enclosure 20 provides a weatherproof enclosure for housing the television 11 when the television 11 is in the storage position. In an exemplary embodiment, the enclosure 20 includes a housing 25 having an opening 30 at one end thereof, and a cover 50 that is engageable with the housing 25 for sealing the opening 30. That is, the cover 50 seals the opening 30 when the television 11 is in the storage position so that the enclosure 20 is weatherproof for protecting the television when not in use.

With reference to FIGS. 2 and 3, the housing 25, in one embodiment, has a generally box-like shape having a cavity for receiving the television 11. In one embodiment, the housing 25 includes a front wall 32, a rear wall 34, a pair of side walls 36, and has the opening 30 at one end (e.g., a top side) and is enclosed at an opposite end (e.g., a bottom side). In one embodiment, the front and rear walls 32, 34 are substantially parallel to each other, and the side walls 36 connect the front and rear walls 32, 34 and are substantially parallel to each other and substantially perpendicular to the front and rear walls 32, 34. As such, the housing 25 may have a substantially rectangular cross-sectional shape, and the opening 30 may also have a substantially rectangular shape. The housing 25, in one embodiment, may be formed of galvanized steel (e.g., sheet metal), but in other embodiments, may be formed of stainless steel, aluminum, plastic, fiberglass, ceramic, or any other suitable material or combination thereof. Further, the housing 25 may have any suitable coating or finish (e.g., powder coating) for corrosion resistance and/or aesthetic purposes. In one embodiment, the housing 25 may be made of or covered with wicker, for example. Further, in one embodiment, the front wall 32 may be made of a transparent material such that the television 11 is viewable while in the storage position. In such an embodiment, the enclosure 20 may have a vent, such as vent that may be openable during operation of the television 11 to release heat from inside the enclosure 20, and sealable when the television 11 is not in use for weatherproofing the enclosure 20.

In one embodiment, the housing 25 is configured to be mounted to a structure, such as an exterior wall. With reference to FIG. 1, the housing 25, in one embodiment, includes one or more mounting devices 40, such as flanges, brackets, or any other suitable devices, for mounting the enclosure 20 to a support structure, such as a wall. The mounting devices 40, in one embodiment, include a plurality of flanges having mounting surfaces that are proximate and substantially parallel to the front wall 32 of the housing 25. As such, the housing 25 is configured to be mounted with the front wall 32 facing a support structure (e.g., a rear side of a barbeque island) such that the housing 25 may be hidden from view behind the support structure, and the television 11 is lifted above the support structure when in the viewing position. In other embodiments, however, the housing 25 may be mounted to a support structure such that the rear wall 34 faces the support structure, such as described below with respect to FIGS. 6-9. Also, embodiments of a media apparatus of the present invention are not limited to being mounted to a wall or other structure. For example, in other embodiments, the media apparatus 10 may be a free-standing unit and/or may include casters, such as described below with respect to FIG. 12, so that the media apparatus 10 may be easily moved across a floor or other surface. Further, the housing 25 may include weights at a lower portion thereof for stability during transport and/or cushioning material on interior surfaces thereof for protecting the television 11 against impact.

With further reference to FIGS. 2 and 3, the housing 25 may include one or more stiffeners 45. In one embodiment, the stiffeners 45 include a pair of horizontal bands (i.e. strongbacks) extending around the rear wall 34 and the side walls 36 of the housing 25. However, embodiments of the present invention are not limited thereto, and in other embodiments, the housing 25 may include any suitable stiffening device or combination thereof for providing strength and rigidity to the housing 25, including, but not limited to, ribs, flanges, and/or channels.

With further reference to FIGS. 2 and 3, in one embodiment, the housing 25 includes a flange 38 surrounding the opening 30 and extending away, or in an outward direction, from the opening 30. The flange 38 provides an enlarged surface area for engaging the cover 50 when the cover 50 seals the opening 30. The flange 38, in one embodiment, may be formed by bending respective ends of the front, rear, and side walls 32, 34, 36 adjacent the opening 30 in respective outward directions away from the opening 30. Alternatively, the flange 38 may be formed in any other suitable manner, such as by attaching (e.g., welding) a flange portion to the housing 25.

The cover 50, in one embodiment, includes a substantially flat panel 52 having a lower surface which abuts an upper surface of the flange 38 (or a gasket 60 on the flange 38, as described below) when the television is in the storage position. In one embodiment, the cover 50 further includes a flange 54 around a periphery of the panel 52 which surrounds the flange 38 of the housing 25 when the cover 30 is engaged with the housing 25 for sealing the opening 30. As shown in FIGS. 1-3, the flange 54 may extend downward over the flange 38 of the housing 25 for preventing precipitation or dust from entering through the opening 30 of the housing 25. The flange 54, in one embodiment, may be formed by bending peripheral edges of the panel 52 (e.g., in a downward direction). Alternatively, the flange 54 may be formed by any other suitable device or method, such as by attaching (e.g., welding) the flange 54 to the panel 52. The cover 50, in one embodiment, may be formed of galvanized steel (e.g., sheet metal), but in other embodiments, may be formed of stainless steel, aluminum, plastic, fiberglass, ceramic, or any other suitable material. Further, the cover 50 may have any suitable coating or finish (e.g., powder coating) for corrosion resistance and/or aesthetic purposes. In one embodiment, the cover 50 may be made of or covered with wicker, for example. Further, in one embodiment, the cover 50 may be lockable to the housing 25 in the sealing position for security purposes, as may be desirable during long periods of storage, for example. Also, in one embodiment, the media apparatus 10 may include a security alarm configured to provide a signal when the cover 50 is opened from the sealing position.

In one embodiment, the cover 50 may further include a hat channel 55 connected between the panel 52 and the lift device 70. For example, the hat channel 55 may include a base portion 56 mountable on the lift device 70, and at least one offset portion 58 spaced apart in an upward direction from the base portion. The offset portion 58 is attached to the lower surface of the panel 52 and raises the lower surface of the panel 52 relative to the television 11 to ensure that the cover 50 engages the housing 25 and seals the opening 30. Also, the hat channel 55 raises the cover 50 relative to the television 11 such that the flange 54 of the cover 50 is above and does not obstruct viewing of the television 11.

In one embodiment, the media apparatus 10 includes a gasket 60 between the housing 25 and the cover 50 for providing a weatherproof seal therebetween when the television 11 is in the storage position and the cover 50 engages the housing 25. In one embodiment, the gasket 60 is attached to the upper surface of the flange 38 of the housing 25 and contacts the lower surface of the panel 52 of the cover 50 when the television 11 is in the storage position and the cover 50 engages the housing 25. In another embodiment, the gasket 60 may be attached to the lower surface of the panel 52 of the cover 50 and may contact the upper surface of the flange 38 of the housing 25 when the television 11 is in the storage position and the cover 50 engages the housing 25. The gasket 60 may be formed of a rubber or other sealing material suitable for outdoor use.

The lift device 70 is configured to lift the television 11 out of the housing 25 from the storage position to the viewing position, and is further configured to lower the television 11 back into the housing 25 from the viewing position to the storage position. The lift device 70 includes a support base 72 and an extension column 74 that is extendable and retractable relative to the support base 72. In one embodiment, the extension column 74 is telescoping. In one embodiment, the support base 72 includes at least one mounting portion 75 for mounting the support base 72 (e.g., via fasteners) to an interior of the housing 25. The extension column 74 includes a mounting bracket 76 for mounting the television 11 to the extension column 74. In one embodiment, the television 11 is removably attachable to the mounting bracket 76, such that the television 11 may be easily replaced with another television, such as a television having a different size than the replaced television 11. Further, in one embodiment, the media apparatus 10 may include an adapter plate 77 connected to the mounting bracket 76 and including a plurality of fastener holes 77' for connecting the television 11 to the adapter plate 77. The fastener holes 77', in one embodiment, are spaced apart from one another in a vertical direction such that a mounting height of the television 11 is adjustable, and the adapter plate 77 is configured for removably attaching any of various televisions having different sizes (e.g., heights). Further, in one embodiment, the media apparatus 10 may include a mounting plate 78 connected between the adapter plate 77 and the television 11. The mounting plate 78, in one embodiment, includes a wall plate 78A connected to the adapter plate 77, a pair of vertically extending brackets 78B attached to the television 11 and being configured to mount on the wall plate 78A, such as hooking onto the wall plate 78A via grooves, and a locking bar 78C which is configured to slidably engage the wall plate 78A and the brackets 78B for securing the brackets 78B to the wall plate 78A. In one embodiment, the wall plate 78A includes a plurality of fastener holes 78A' or slots for connecting the television 11 to the adapter plate 77. The fastener holes 78A', in one embodiment, are spaced apart from one another in a horizontal direction and are alignable with the fastener holes 77' of the adapter plate 77 for connecting the television 11 to the adapter plate 77. In one embodiment, the mounting plate 78 may be manufactured by Premier Mounts (e.g., Model No. LPFM3752). However, embodiments of the present invention are not limited thereto, and, in other embodiments, the media apparatus 10 may include any other suitable device for mounting the television 11 to the extension column 74. In one embodiment, the support base 72 has an interior space in which cables or power cords may be arranged. Further, in one embodiment, the media apparatus 10 may include a pair of locking devices 73 attached to the wall plate 78A at outer sides, or at inner sides, of the brackets 78B to restrain the brackets 78B from sliding (e.g., in a horizontal direction) along the wall plate 78A, such as in an embodiment in which the media apparatus 10 is moved on a trolley, as described later herein, or may otherwise be subject to vibration or lateral forces.

Further, in one embodiment, the cover 50 is connected (e.g., via fasteners) to the mounting bracket 76, such as at an upper surface thereof, such that when the extension column 74 is in the retracted position, the cover 50 seals the opening 30 of the housing 25, and when the extension column 74 moves to the extended position, the cover 50 is moved together with the extension column 74 to a position offset from the flange 38 of the housing 25. In one embodiment, the cover 50 is connected to the mounting bracket 76 through the connection hat 55. In one embodiment, the lift device 70 may be electrically powered through an AC voltage source. However, in other embodiments, the lift device 70 may be operable via battery power, solar power, or any other suitable power source. According to one embodiment, the lift device 70 may be a television lift device for use in indoor applications and may be modified for outdoor use. For example, in one embodiment, the lift device 70 may be manufactured by TiMotion (e.g., Model No. TVL-170-24-36"). However, in other embodiments, the lift device 70 may include any other suitable mechanism, actuator, or device suitable for moving the television 11 between the storage position and the viewing position. For example, in one alternative embodiment according to the present invention, the lift device 70 may include one or more locking gas springs, such as one or more locking gas springs manufactured by Industrial Gas Springs, Inc.

With reference to FIG. 2, in one embodiment, the media apparatus 10 further includes at least one media player 12, such as a DVD player, a Blu-ray Disc player (Blu-ray Disc is a registered trademark owned by Blu-ray Disc Association), a cable box, a digital video recorder, a computer, and/or a flash drive. In one embodiment, the media apparatus 10 includes a support member 79 (e.g., a sleeve) for attaching the media player 12 to the mounting plate 78 or, alternatively, to the adapter plate 77, to the lift device 70, or directly to the television 11. As such, the media player 12 is movable together with the extension column 74 of the lift device 70 between a protected position inside the housing 25 and an accessible position outside the housing 25.

The fastener holes 78A' of the wall plate 78A, in one embodiment, are spaced apart from one another in a horizontal direction, and the position of the wall plate 78A is adjustable along the horizontal direction. In one embodiment, the position of the wall plate 78A is adjusted along the horizontal direction such that a vertical centerline of the wall plate 78A is offset to one side of a vertical centerline of the television 11, as shown in FIG. 2. As also shown in FIG. 2, the offset position of the wall plate 78A facilitates the media player 12 being mounted on one side of the lift device 70. Also, the offset position of the wall plate 78A provides clearance for input and output ports 11A of the television 11, and the media player 12 is mounted at a side of the lift device 70 opposite the input and output ports 11A, and therefore does not interfere with a floor box 65 providing power and/or communication inputs or a connector face plate 66 having connections to the input and output ports 11A in the housing 25 at the opposite side when the media player 12 is in a stored position in the housing 25.

According to one embodiment, the media apparatus 10 includes a sensor 80 (see FIG. 3) configured to receive a signal (e.g., an infrared signal) from a remote control device, and the lift device 70 is operable to move the television 11 between the storage position and the viewing position when the sensor 80 receives a signal from the remote control device. Further, in one embodiment, the sensor 80 may be configured to receive a signal from the remote control (e.g., a universal remote control) for operating the television 11 and/or the media player 12. In one embodiment, the media apparatus 10 may include a manually operable switch 82 located on the housing 25 (see FIG. 3) or at a location remote from the housing 25 for operating the lift device 70. Also, in one embodiment, the media apparatus 10 may include both the sensor 80 and the manually operable switch 82.

In one embodiment, the media apparatus 10 includes a safety device 84 (see FIG. 3) configured to stop operation or reverse a direction of movement of the lift device 70 when an obstruction is detected. As such, the safety device 84 may prevent injury to a person or damage to the media apparatus 10 and/or an object in the path of the cover 50 or other moving components of the media apparatus 10. For example, in one embodiment, the safety device 84 includes a sensor configured to detect an obstruction (e.g., a person's hand) and send an electrical signal to a controller which is configured to stop the operation or reverse a direction of movement of the lift device 70. For example, the safety device 84 may include a proximity sensor, such as, but not limited to, a capacitive, inductive, photoelectric, acoustic, or infrared beam-type sensor, for determining the presence of an obstruction. In another embodiment, for example, the safety device 84 may include a pressure sensor, such as for sensing a change in pressure of a gas-filled member between the housing 25 and the cover 50 that an obstruction may cause. In another embodiment, for example, an electronic signal may be applied to a portion of the housing 25 or the cover 50 that is contactable with the other and monitored by a sensor in order to detect the presence of an obstruction, such as applied by SawStop, LLC in safety devices for saws. In one embodiment, the safety device 84 may be configured to emit an audible alarm when the extension column 74 is moving. Further, in one embodiment, the safety device 84 may be configured to stop the extension column 74 when the cover 50 is within a certain distance from the housing 25, and to thereafter require reactivation of the lift device 70 or a manual force to move the cover 50 the remaining distance to the sealing position. Further, in one embodiment, a key may be required to move the extension column 74.

In use, the media apparatus 10 is operated to move the television 11 from a storage position (see FIG. 1) in which the television 11 is inside the enclosure 20 for weatherproof storage, to a viewing position (see FIGS. 2 and 3) in which the television 11 is outside the housing 25 for viewing, and back to the storage position for protection when the television 11 is not in use. Further, as described above, the television 11 is mounted to the extension column 74 such that when the extension column 74 is in a first position (i.e. the retracted position), the television 11 is in the storage position, and when the extension column 74 is in a second position (i.e. the extended position), the television 11 is in the viewing position. Further, as described above, the cover 50 is attached to the extension column 74 such that when the extension column 74 is in the retracted position and the television 11 is in the storage position, the cover 50 is in a closed position and seals the opening 30 of the housing 25 for weatherproofing the interior of the housing 25. On the other hand, when the extension column 74 is in the extended position and the television 11 is in the viewing position, the cover 50 is in an open position and does not seal the opening 30 of the housing 25. In use, the extension column 74 may be moved between the retracted position and the extended position via a remote control signal to the sensor 80 and/or via the manually operable switch 82.

While the lift device 70 is described above and shown in the drawings as being configured to lift the television 11 upward from the storage position to the viewing position, embodiments of the present invention are not limited thereto. That is, in another embodiment, the viewing position may be below the storage position, such that the lift device 70 lowers the television 11 downward out of the opening 30 that is at the bottom of the housing 25 from the storage position to the viewing position and back upward from the viewing position to the storage position. In such an embodiment, the media apparatus 10 may be hung from a ceiling or other structure. Further, in such an embodiment, the cover 50 that is movable with the lift device 70 seals the opening 30 that is at the bottom of the housing 25, and the flange 54 may be absent from the cover 50 such that water does not accumulate on the cover 50, or alternatively, the cover 50 may include a suitable drainage opening or device. In yet another embodiment, the viewing position may be located to one side of the storage position, and the lift device 70 may be configured to move the television 11 horizontally in a direction to the one side for viewing and back in the opposite direction for storage.

In one embodiment, the lift device 70 may be further configured to rotate the television 11 about an axis extending in a direction of movement of the extension column 74. That is, the lift device 70 may be configured to swivel the television 11 for an improved viewing angle after the television 11 has been moved to the outside of the housing 25. In one embodiment, the lift device 70 that is configured to swivel may be manufactured by Nexus 21 TV Lift Systems (e.g., Model No. L-39S). Further, in one embodiment, the lift device 70 may be configured to rotate the television 11 about an axis extending in a direction perpendicular to a direction of movement of the extension column 74. That is, the lift device 70 may be configured to tilt the television 11 for an improved viewing angle after the television 11 has been moved to the outside of the housing 25.

According to an embodiment of the present invention, the television 11 is mounted to the extension column 74 and when lifted outside the housing 25 for viewing, the television 11 is not obstructed. That is, when the television 11 is in the viewing position, there is not a component of the media apparatus 10 between the user of the media apparatus 10 and the television 11. As such, visibility of the television 11 is not impaired or hindered by the media apparatus 10. Further, in an embodiment of the present invention, the television 11 is not encased or enclosed when in the viewing position and, as such, ventilation and cooling of the television 11 is not impaired or hindered by the media apparatus 10.

According to one embodiment, the media apparatus 10 is a fully contained unit that is configured to be used at various locations, such as an outdoor patio or a parking lot. For example, in one embodiment, the media apparatus 10 may be configured to be attached to a trailer hitch, such as for use while camping or tailgating. Further, in one embodiment, the media apparatus 10 is configured for plug-and-play use, and may include a single power input for supplying power to all of the components of the media apparatus 10, including the television 11, the media player 12, and the lift device 70. In one embodiment, the media apparatus 10 is configured for wireless operation, and further may be Wi-Fi enabled for wireless local area network connection (Wi-Fi is a registered trademark of Wi-Fi Alliance). In one embodiment, the Media apparatus 10 may include a heating and/or a cooling device for protecting the television 110 against adverse temperatures.

Figure 4:
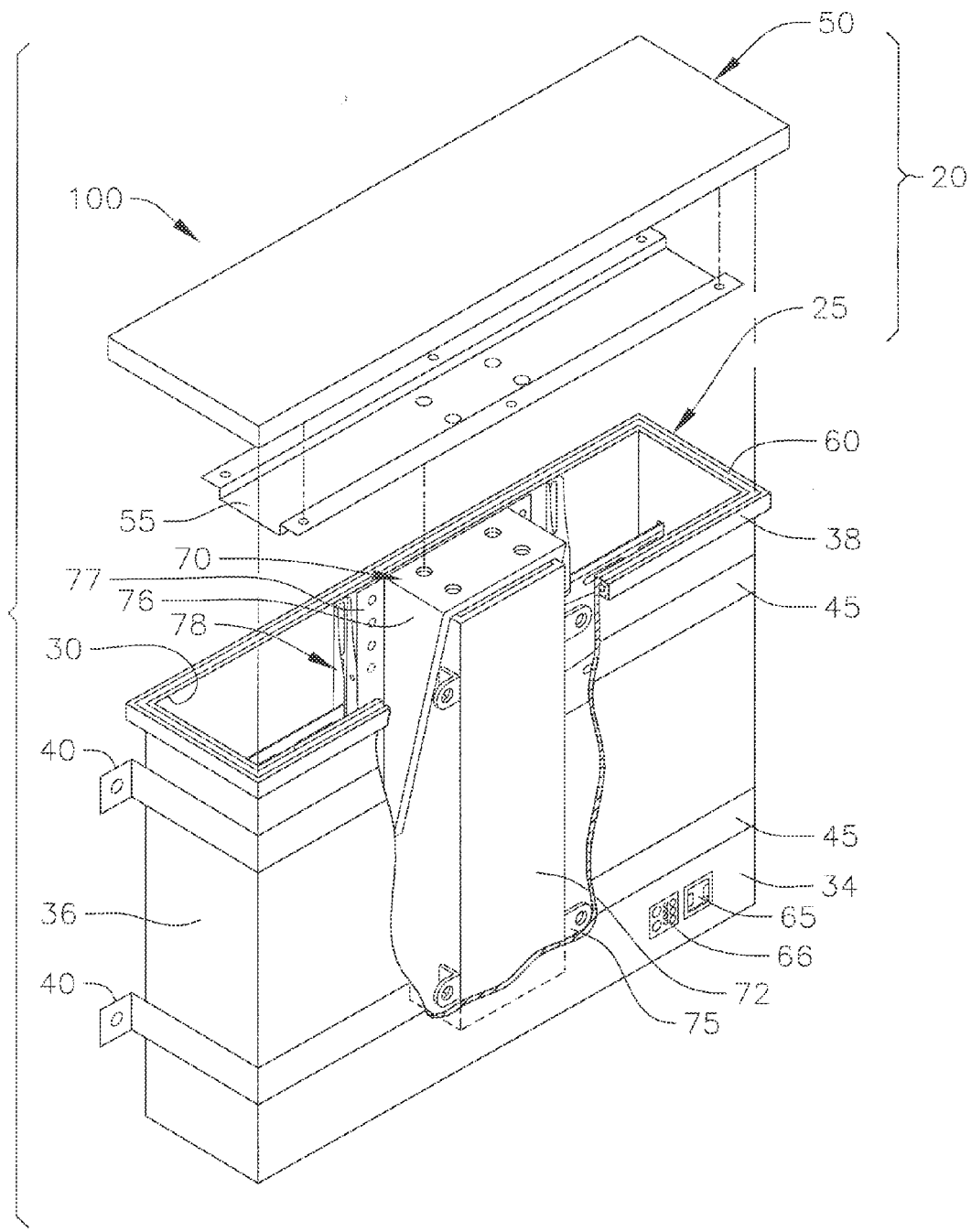
FIG. 4 is a partially exploded rear perspective view of a television lift assembly according to an embodiment of the present invention, the television lift assembly being shown in a storage position.
Figure 5:
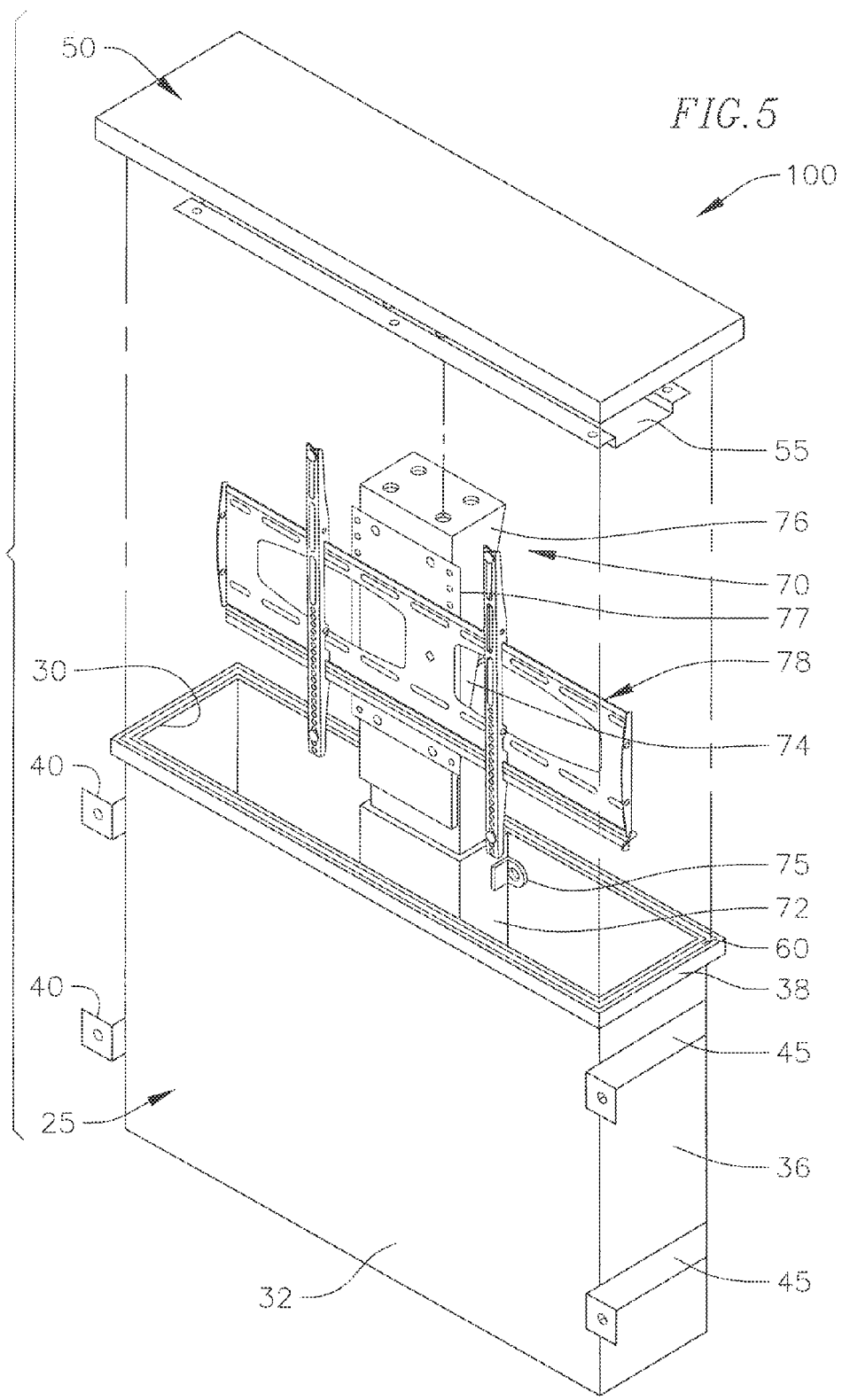
FIG. 5 is a partially exploded front perspective of the television lift assembly of FIG. 4, the television lift assembly being shown in a viewing position.
Figure 6:
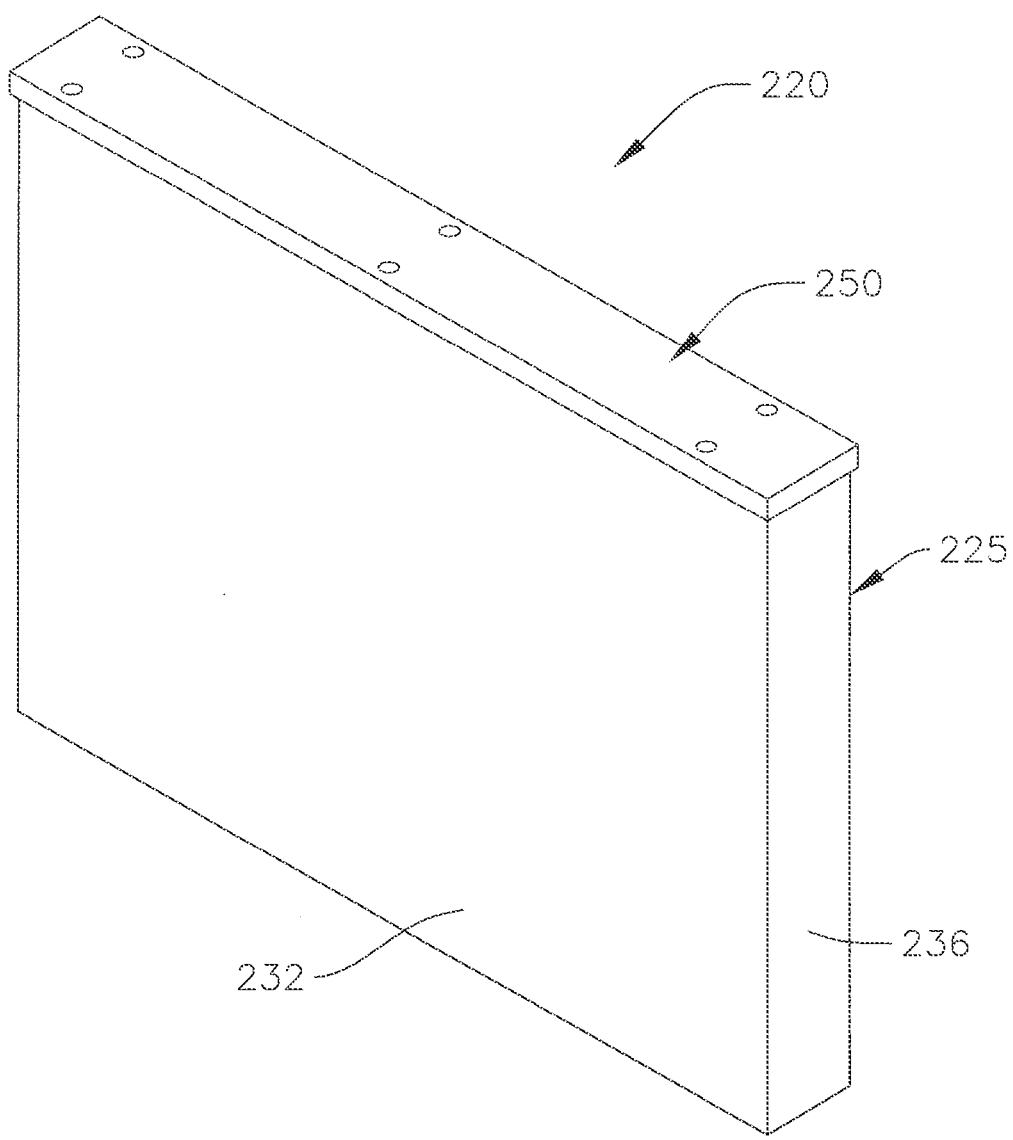
FIG. 6 is a front perspective view of an enclosure of a television lift assembly according to another embodiment of the present invention.
Figure 7:
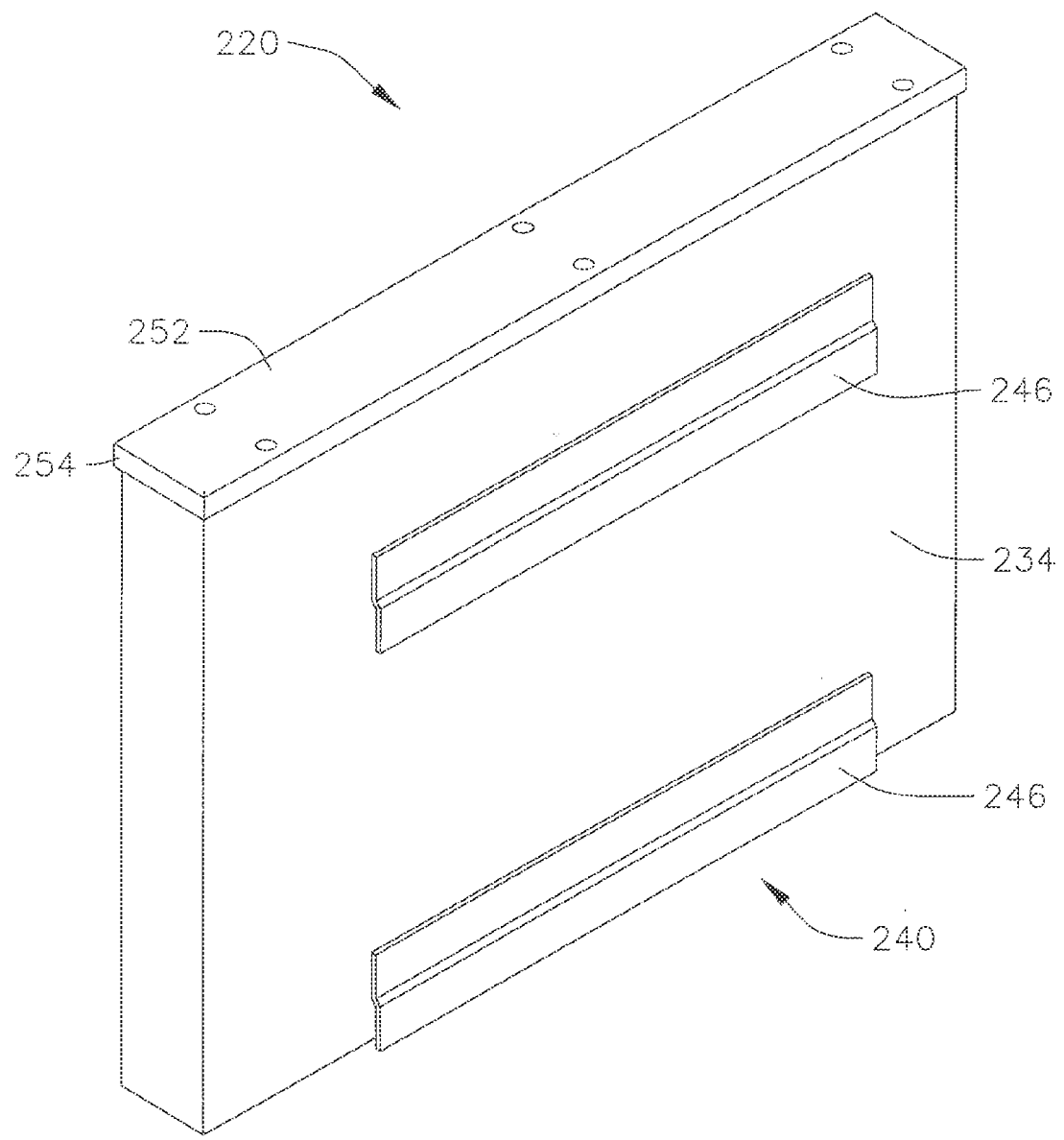
FIG. 7 is a rear perspective view of the enclosure of FIG. 6.
Figure 8:
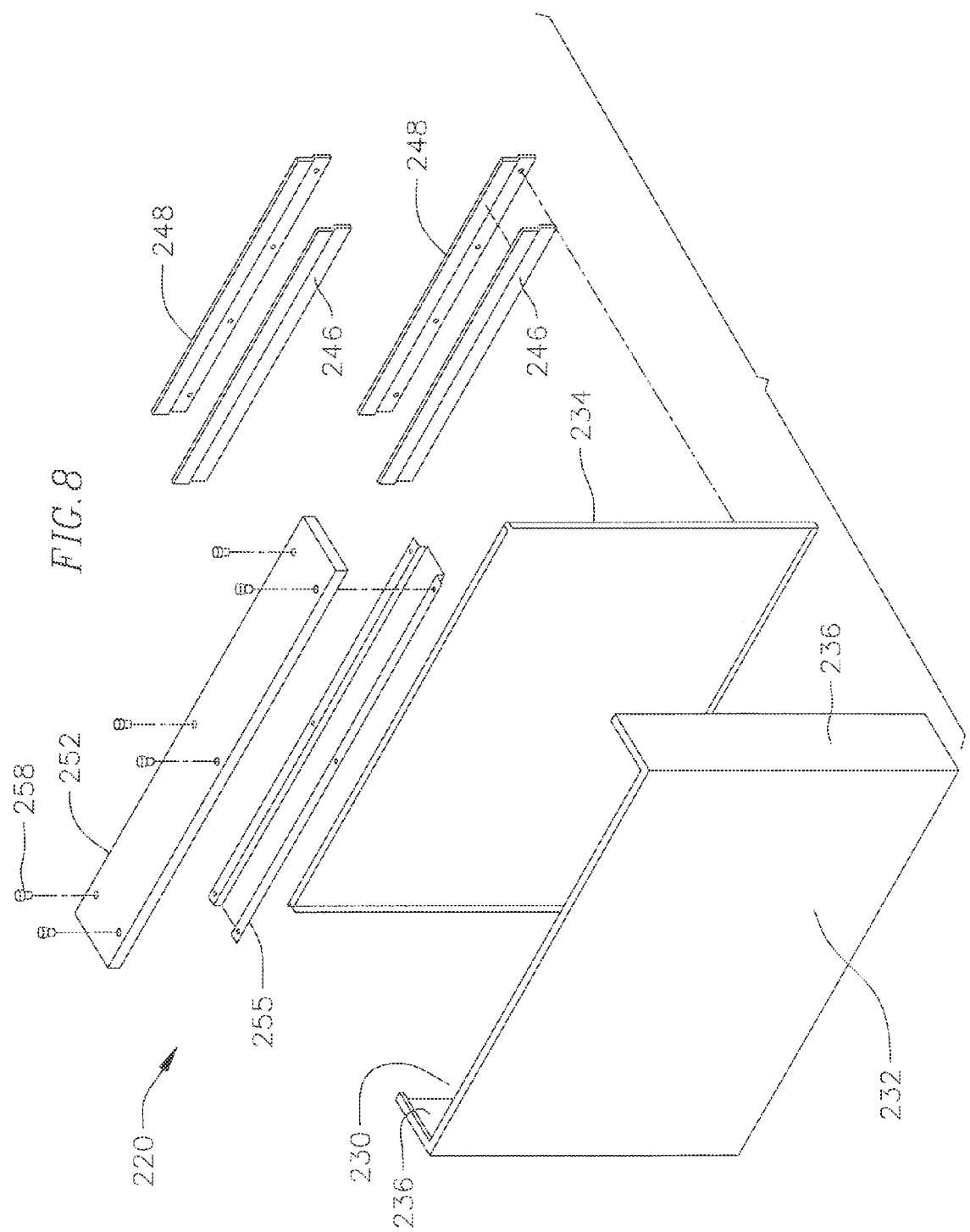
FIG. 8 is an exploded front perspective view of the enclosure of FIG. 6.
Figure 9:
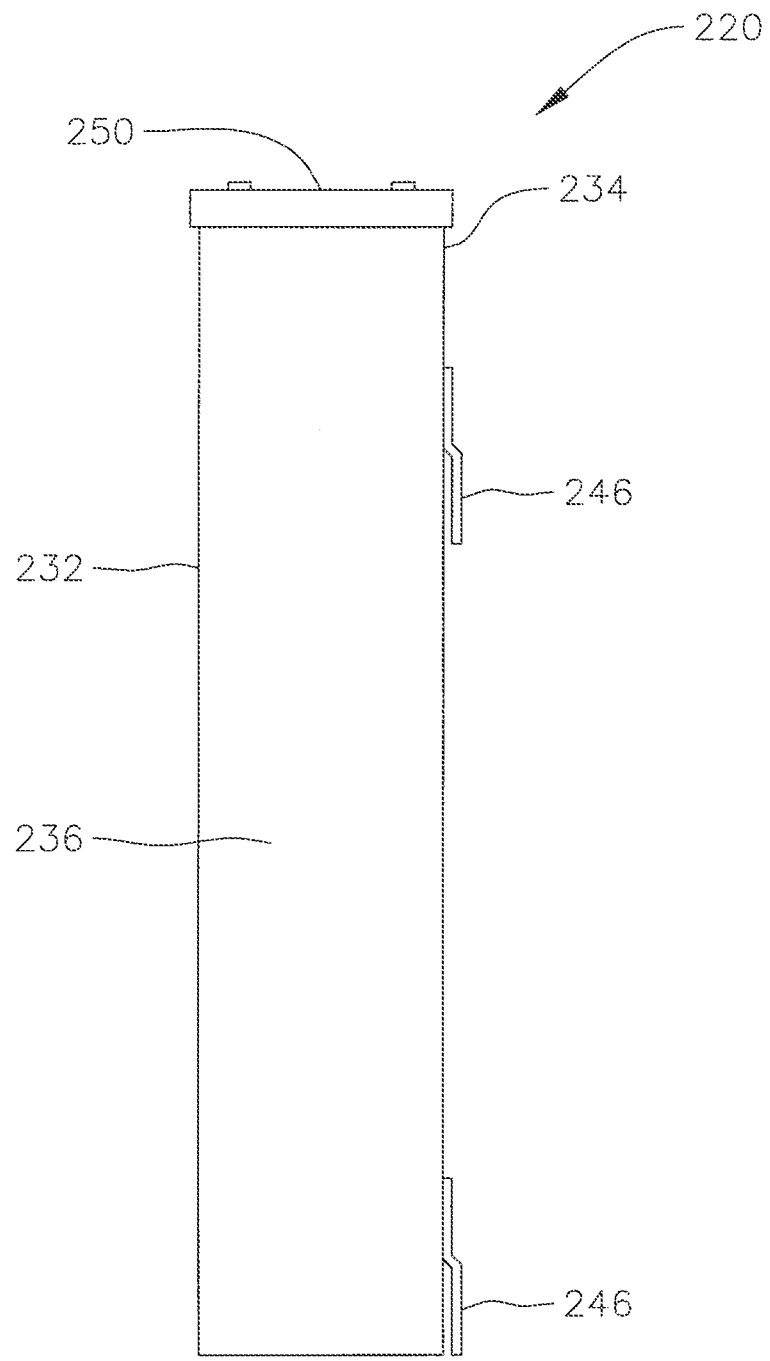
FIG. 9 is a side view of the enclosure of FIG. 6.

With reference to FIGS. 4 and 5, a television lift assembly 100 according to another exemplary embodiment of the present invention includes the enclosure 20 and the lift device 70. The television lift assembly 100 is configured to house a television or other video display device in the weatherproof enclosure 20 in a storage position (see FIG. 4) when not being viewed, and lift the television or video display device outside the enclosure 20 to a viewing position (see FIG. 5) in which the television or video display device may be viewed. In one embodiment, the television lift assembly 100 includes the enclosure 20, the lift device 70, the adapter plate 77, and the mounting plate 78 described above with respect to the media apparatus 10 and, therefore, further description of these components will not be repeated herein.

According to one embodiment, the extension column 74 of the lift device 70 is movable between a retracted position and an extended position. In the retracted position, the extension column 74 is inside the housing 25, and the cover 50 seals the opening 30 of the housing 25 for protecting a television or other video device mounted to the extension column 74 inside the sealed enclosure 20. In the extended position, the extension column 74 extends outside the housing 25 for lifting the television outside the housing 25 for viewing, and the cover 50 is offset from the housing 25. In one embodiment, the cover 50 is connected to the extension column 74 through the mounting bracket 76.

With reference to FIGS. 6-9, an enclosure 220 for a television lift assembly according to another embodiment of the present invention is mountable from a rear side to a support structure, such as a wall. The enclosure 220 may be included in other embodiments of the media apparatus 10 and the television lift assembly 100 instead of the enclosure 20 described above. In one embodiment, the enclosure 220 includes a housing 225 having an opening 230 at one end thereof, and a cover 250 that is engageable with the housing 225 for sealing the opening 230. The housing 225, in one embodiment, has a generally box-like shape having a cavity for receiving a television and a lift device for raising and lowering the television. In one embodiment, the housing 225 includes a front wall 232, a rear wall 234, and a pair of side walls 236, and has the opening 230 at one end (e.g., a top side) and is enclosed at an opposite end (e.g., a bottom side). In one embodiment, the front and rear walls 232, 234 are substantially parallel to each other, and the side walls 236 connect the front and rear walls 232, 234 and are substantially parallel to each other and substantially perpendicular to the front and rear walls 232, 234. As such, the housing 225 may have a substantially rectangular cross-sectional shape, and the opening 230 may also have a substantially rectangular shape. However, in other embodiments, the housing 225 may have a different shape, such as an oblong shape similar to that of the housing shown in FIG. 11. Though not shown in the drawings, the enclosure 220 may include a flange on the housing 225 surrounding the opening 230, and/or a gasket between the housing 225 and the cover 250 for sealing the opening 230.

The housing 225, in one embodiment, further includes a mounting device 240 for mounting the housing 225 to a structural support, such as a wall. In one embodiment, the mounting device 240 includes a pair of French clips 246 or similar device configured to mount the housing 225 to a corresponding pair of mating clips 248 (see FIG. 8) attachable to the structural support with the rear wall 234 of the housing 225 facing the structural support. In one embodiment, the French clips 246 are attached (e.g., welded) directly to the rear wall 234. In an alternative embodiment, the mounting device 240 may include a bracket and/or spacers (not shown) coupled between the rear wall 234 and the French clips 246.

The cover 250, in one embodiment, includes a substantially flat panel 252 and a flange 254 around a periphery of the panel 252, similar to the cover 50 described above. Also, the cover 250 may include a connection hat 255 coupled to the panel 252, such as via fasteners 258, for connecting the cover 250 to an extendable and retractable portion of the lift device. In one embodiment, in order to deter theft, the fasteners 258 may be security screws that require a security tip screwdriver for removal. The housing 225 and the cover 250, in one embodiment, may be formed of galvanized steel, but in other embodiments, may be formed of stainless steel, aluminum, plastic, fiberglass, ceramic, or any other suitable material or combination thereof. Further, the housing 225 and the cover 250 may have any suitable coating or finish (e.g., powder coating) for corrosion resistance and/or aesthetic purposes. In one embodiment, the housing 225 and the cover 250 may be made of or covered with wicker, for example.

Figure 10:
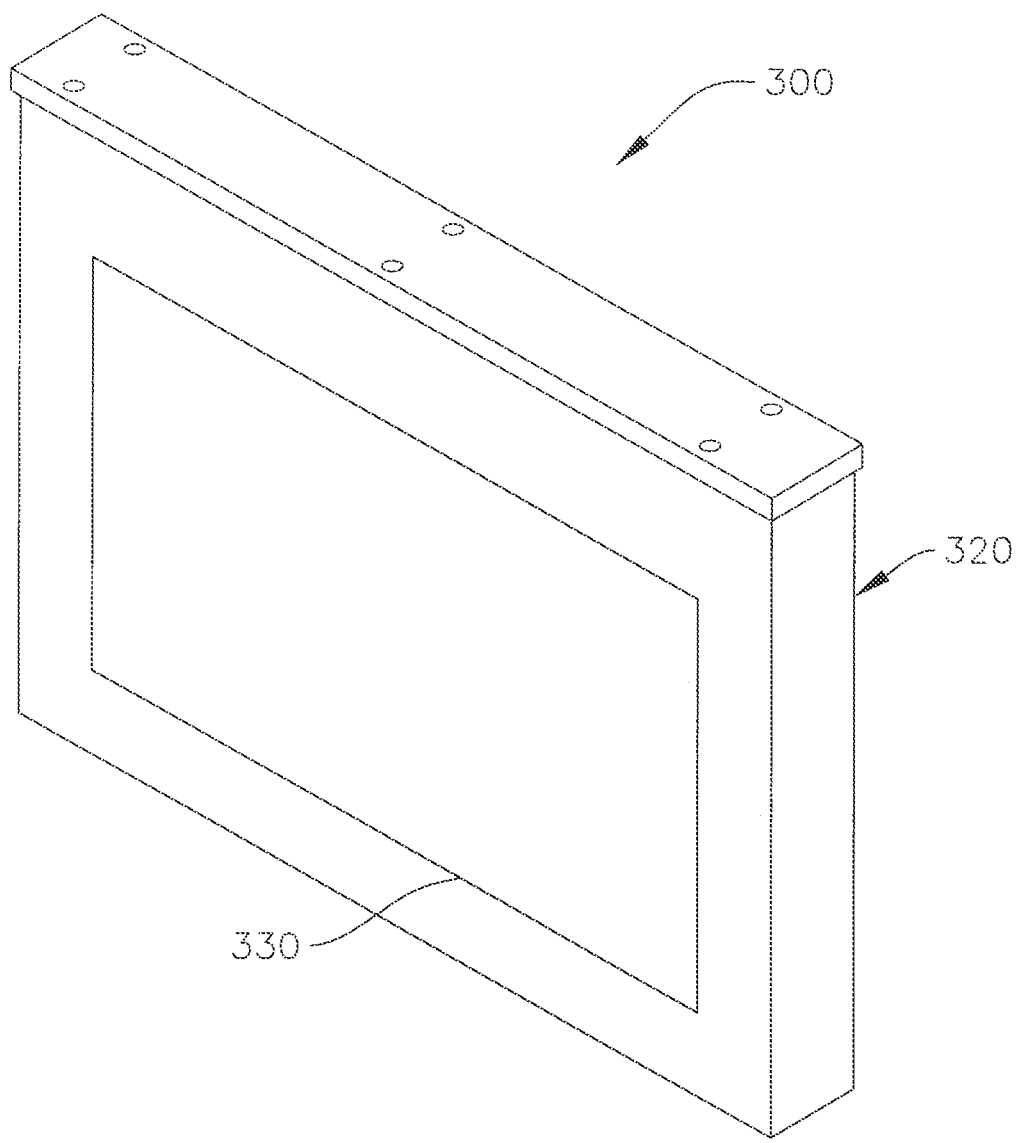
FIG. 10 is a front perspective view of a television lift assembly according to another embodiment of the present invention, the television lift assembly being shown in a storage position.

With reference to FIG. 10, a television lift assembly 300 includes an enclosure 320, which may be similar to one of the enclosures 20, 220 described above or one of the enclosures 420, 520 described below. Additionally, the television lift assembly 300 includes a display portion 330 on the enclosure 320, such as on a front face thereof. For example, the display portion 330 may include signage, advertising, announcements, and/or other information. For example, the television lift assembly 300 may be used at a hotel, a convention, a trade show, or any other setting (e.g., a commercial setting) in which it is desirable to provide such advertising, announcements, and/or other information. Further, the display portion 330 may include a permanent or semi-permanent display device, a removable display device (e.g., an adhering plastic skin or other hangable or mountable display), an electronic video display, digital display, signboard, and/or any other suitable display device. In another embodiment, the display portion 330 may be on at least one side face, a top face, and/or a rear face of the enclosure 320 instead of or in combination with the front face. In one embodiment, the television lift assembly 300 may be mounted on a trolley, as described below with respect to FIG. 12, and may function as a mobile billboard (e.g., a mobile digital billboard). In another embodiment, a television lift assembly may be buried or partially buried below the ground or in a structure and may have a display (e.g., a digital display) mounted on the cover. In one embodiment in which a television lift assembly is partially buried below the ground, for example, the cover may function as a bench when the television is in the storage position.

Figure 11:
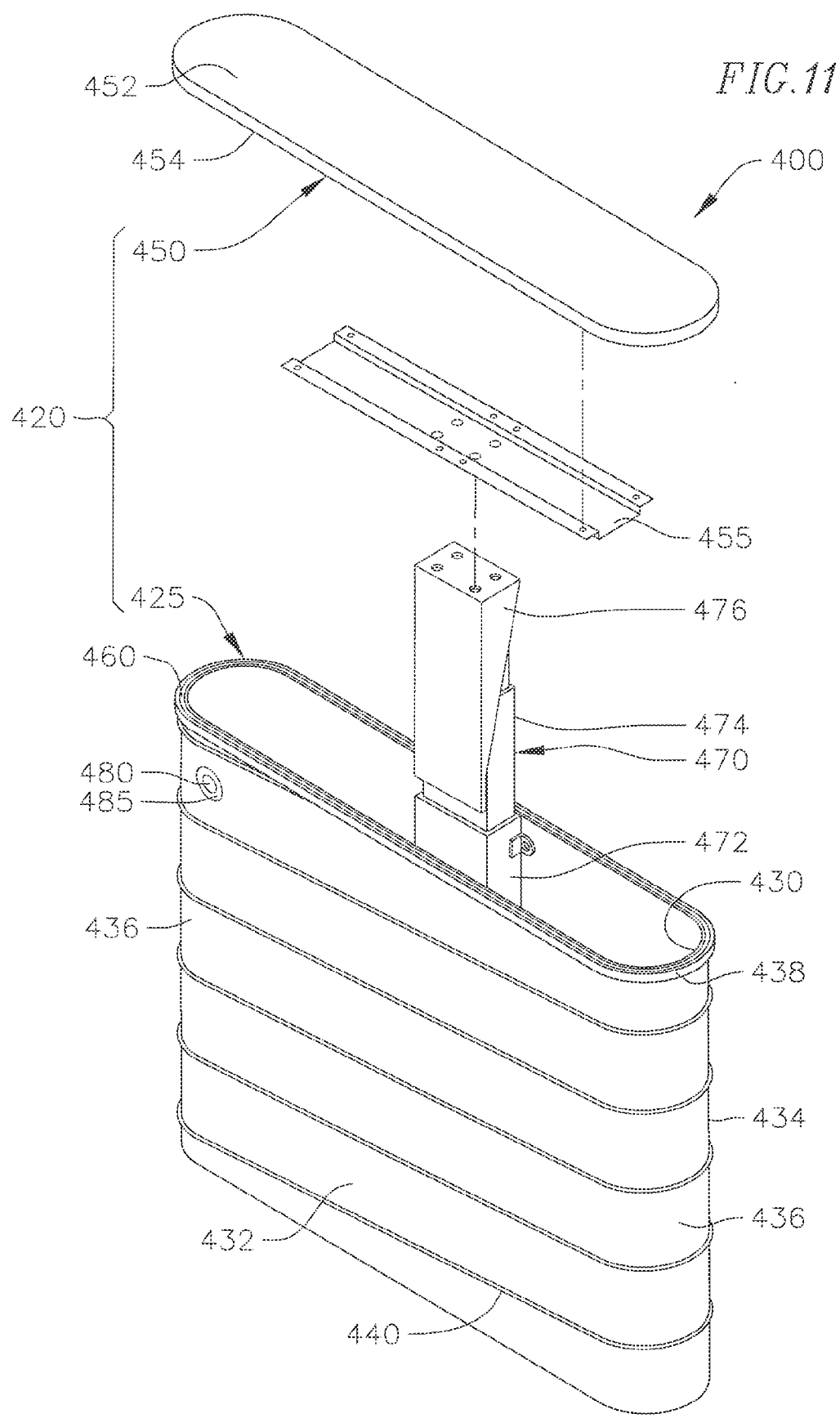
FIG. 11 is a front perspective view of a television lift assembly according to another embodiment of the present invention, the television lift assembly being shown in a viewing position.

With reference to FIG. 11, a television lift assembly 400 according to another embodiment of the present invention includes an enclosure 420 and a lift device 470. The lift device 470 may be the same or functionally equivalent to the lift device 70 described above and includes a support base 472 and an extension column 474 that is extendable relative to the support base 472 for moving a television between a storage position inside the enclosure 420 and a viewing position outside the enclosure 420, and a mounting bracket 476 for mounting the television to the lift device 470. The television lift assembly 400 may also include the adapter plate 77 and the mounting plate 78 described above.

The enclosure 420 includes a housing 425 having an opening 430 at one end (e.g., at a top side), and a cover 450 that is engageable with the housing 425 for sealing the opening 430. The housing 425, in one embodiment, has an elongated shape having a cavity for receiving a television. In one embodiment, the housing 425 includes a front wall 432, a rear wall 434, and a pair of side walls 436, and has the opening 430 at one end (e.g., a top side) and is enclosed at an opposite end (e.g., a bottom side). In one embodiment, the front and rear walls 432, 434 are substantially flat and parallel to each other, and the side walls 436 are arcuate and connect the front and rear walls 432, 434. The housing 425, in one embodiment, may be formed by stretching a length of duct in a direction perpendicular to an axis extending along the length of the duct to provide the housing 425 with an oblong cross-sectional shape. Further, the housing 425, in one embodiment, may be formed of galvanized steel (e.g., sheet metal), but in other embodiments, may be formed of stainless steel, aluminum, plastic, fiberglass, ceramic, or any other suitable material or combination thereof. Further, the housing 425 may have any suitable coating or finish (e.g., powder coating) for corrosion resistance and/or aesthetic purposes. In one embodiment, the housing 425 may be made of or covered with wicker, for example. The housing 425, in one embodiment, includes a flange 438 surrounding the opening 430, similar to the flange 38 of the housing 25 described above. The flange 438 may be attached to the respective ends of the front, rear, and side walls 432, 434, 436, such as by welding (e.g., tack welding).

The housing 425, in one embodiment, includes a spiral stiffener rib 440 extending around a periphery of the exterior of the housing 425. However, in other embodiments, the housing 425 may include any other suitable stiffener device or combination thereof for providing strength and rigidity to the housing 425. The housing 425 may include mounting flanges or brackets (not shown) similar to at least one of the housings 25, 225 described above such that the housing 425 is mountable to a support structure.

The cover 450 may have a shape corresponding to that of the housing 425 (i.e. two flat sides parallel to each other, and two arcuate sides connecting the flat sides). Further, the cover 450 may include a substantially flat panel 452 for covering the opening 430 of the housing 425, and a flange 454 extending downward around a periphery of the panel 452 and surrounding the flange 438 of the housing 425 when the cover 450 engages the housing 425 for sealing the opening 430. In one embodiment, the cover 450 includes a connection hat 455 connected between the cover panel 452 and the extension column 474 of the lift device 470. Further, the enclosure 420 may include a gasket 460 similar to the gasket 60 described above, but having a perimeter shape corresponding to that of the flange 438 and the cover 450.

According to one embodiment, the television lift assembly 400 includes a sensor 480 configured to receive a signal (e.g., an infrared signal) from a remote control device, and the lift device 470 is operable to move the television between the storage position and the viewing position when the sensor 480 receives a signal from the remote control device. Further, in one embodiment, the sensor 480 may be configured to receive a signal from the remote control (e.g., a universal remote control) for operating the television and/or a media player or other component. In one embodiment, the television lift assembly 400 further includes a badge 485 which may be annular in shape and surrounding the sensor 480.

Figure 12:
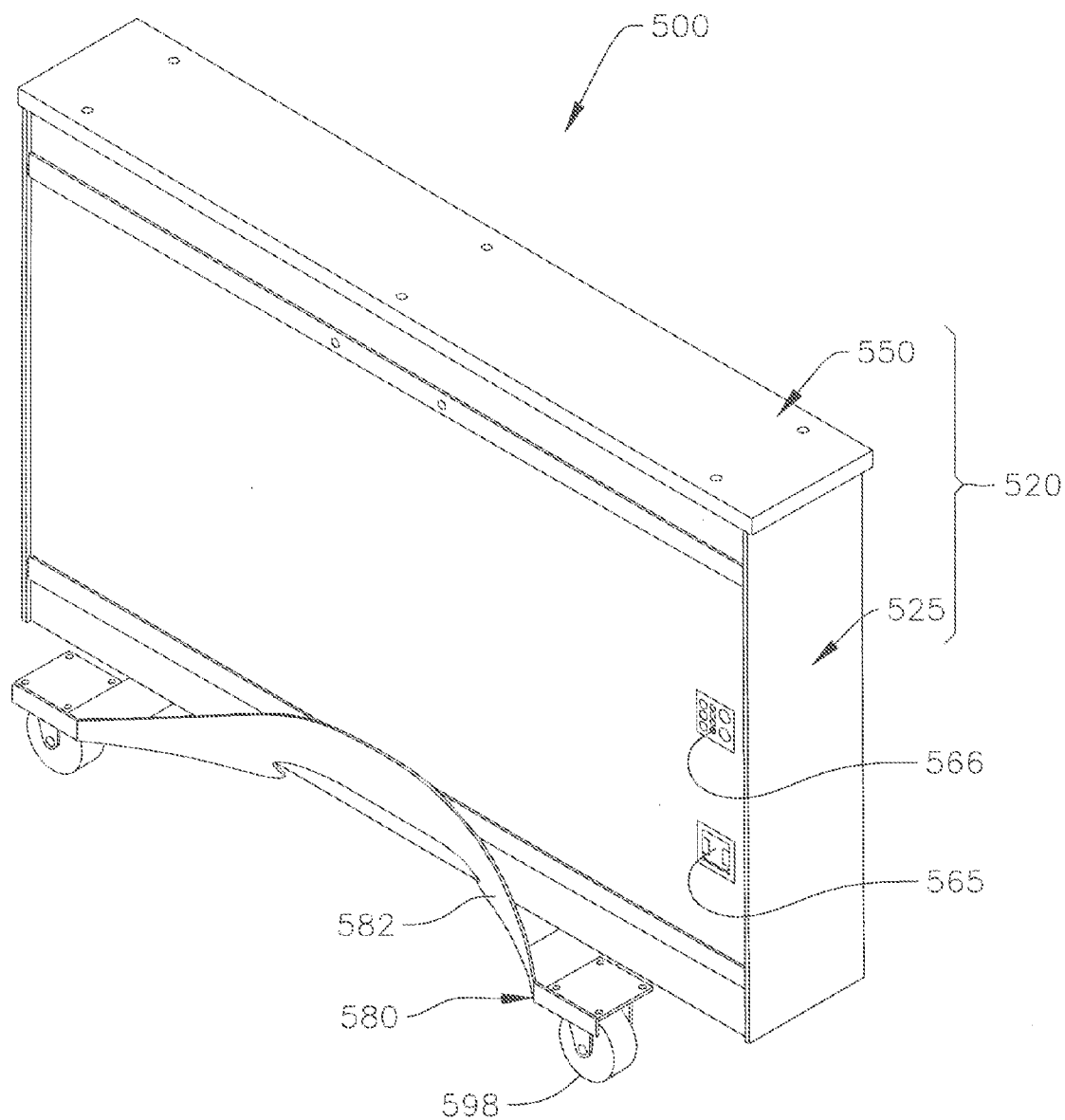
FIG. 12 is a rear perspective view of a television lift assembly according to another embodiment of the present invention.
Figure 13:
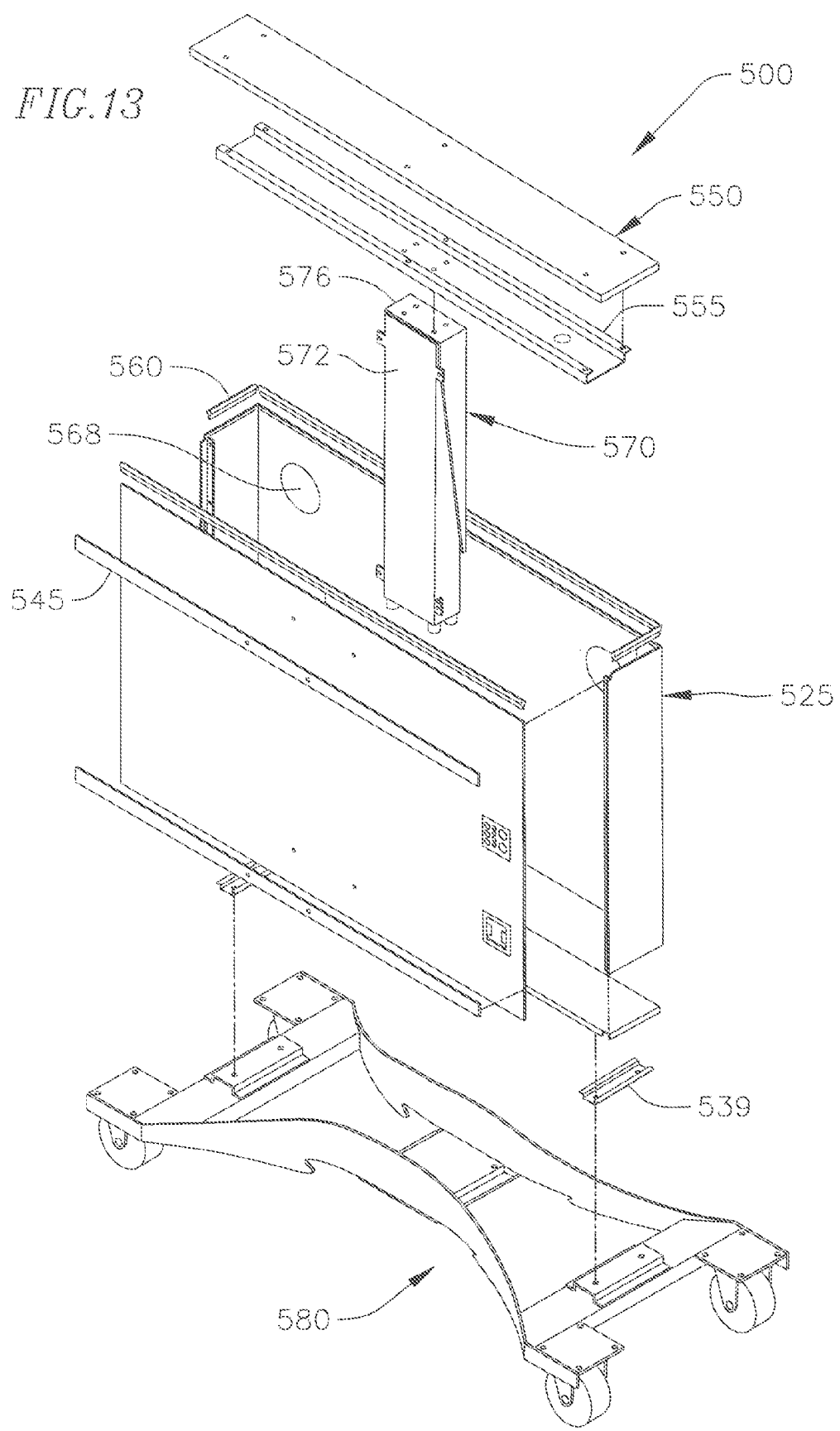
FIG. 13 is an exploded rear perspective view of the television lift assembly of FIG. 12.

With reference to FIGS. 12 and 13, a television lift assembly 500 according to another embodiment of the present invention includes an enclosure 520, a lift device 570, and a trolley 580. The television lift assembly 500 is configured to house a television in the weatherproof enclosure 520 in a storage position (see FIG. 12) when the television is not being viewed, and lift the television out from the enclosure 520 to a viewing position in which the television may be viewed.

The enclosure 520 provides a weatherproof enclosure for housing the television when the television is in the storage position, and the lift device 570 is configured to lift the television out of the enclosure 520 to the viewing position. The lift device 570 may be the same or functionally equivalent to the lift device 70 described above and may include a support base 572, an extension column (not shown) that is extendable relative to the support base 572 for moving the television between the storage position inside the enclosure 520 and the viewing position outside the enclosure 520, and a mounting bracket 576 for mounting the television to the lift device 570. The television lift assembly 500 may also include the adapter plate 77 and the mounting plate 78 described above. Further, the enclosure 520, in one embodiment, is mounted and fastened to the trolley 580, which is configured to allow the television lift assembly 500 having the television mounted therein to be easily and safely moved. In one embodiment, the television lift assembly 500 having the television mounted therein may function as a mobile billboard (e.g., a mobile digital billboard).

In one embodiment, the television lift assembly 500 may include a floor box 565 on an outer surface (e.g., a rear surface) of the housing 525 that provides power and/or communication inputs and facilitates wire and cable management in the television lift assembly 500. In one embodiment, for example, the floor box 565 may be manufactured by Wiremold (e.g., Resource RFB Series) In one embodiment, the television lift assembly 500 may include a connector face plate 566 on an outer surface (e.g., a rear surface) of the housing 525 that includes connectors, such as cable, High-Definition Multimedia Interface (HDMI) (HDMI is a registered trademark owned by HDMI Licensing, L.L.C.), data, flash drive, Universal Serial Bus (USB), and/or audio, for example, for providing a connection, interface to a television and/or media player mounted on the television lift assembly 500, or for providing any other media connection for displaying media and/or data via the television. Further, in one embodiment, the television lift assembly 500 may include one or more audio speakers 568 integrated into the housing 525, such as on a front surface of the housing, for enhancing an audio output of a television mounted on the lift device 570. In one embodiment, the television lift assembly 500 may include a rail or handle (not shown) on an outer surface of the housing 525 that functions as a bumper guard for protection of a television mounted in the television lift assembly 500 or as a handle to facilitate moving the television lift assembly 500 via the trolley 580.

Figure 14:
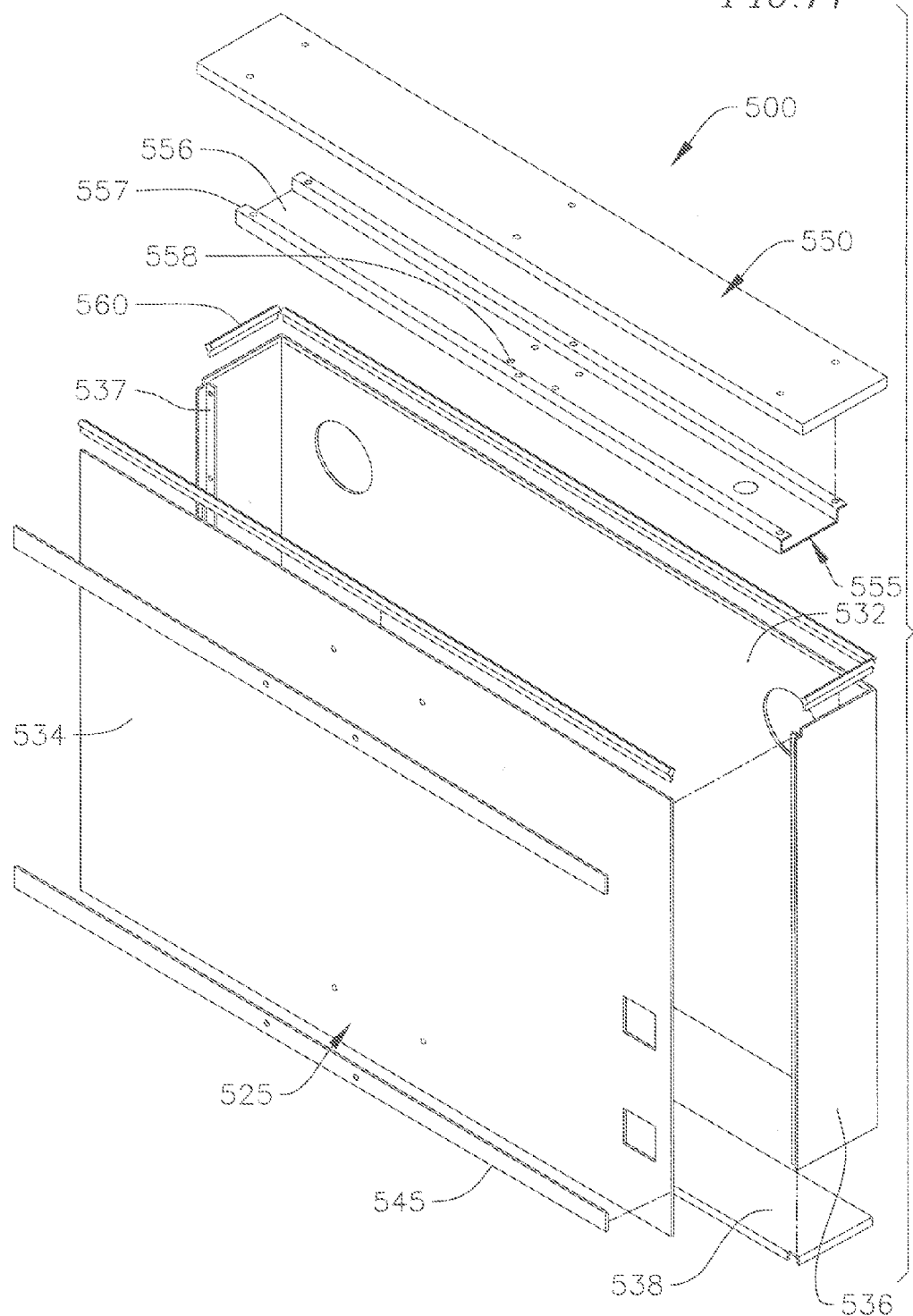
FIG. 14 is an exploded rear perspective view of an enclosure of the television lift assembly of FIG. 12.

With reference to FIG. 14, the enclosure 520 according to one embodiment of the present invention includes a housing 525 and a cover 550. The housing 525, in one embodiment, has a generally box-like shape having a cavity for receiving a television therein. In one embodiment, the housing 525 includes a front wall 532, a rear wall 534, a pair of side walls 536, and has an opening at one end (e.g., a top side) and is enclosed with a bottom plate 538 at an opposite end (e.g., a bottom side). In one embodiment, the front and rear walls 532, 534 are substantially parallel to each other, and the side walls 536 connect the front and rear walls 532, 534 and are substantially parallel to each other and substantially perpendicular to the front and rear walls 532, 534. As such, the housing 525 may have a substantially rectangular cross-sectional shape, and the opening may also have a substantially rectangular shape. The housing 525, in one embodiment, may be formed of galvanized steel (e.g., sheet metal), but in other embodiments, may be formed of stainless steel, aluminum, plastic, fiberglass, ceramic, or any other suitable material or combination thereof. Further, the housing 525 may have any suitable coating or finish (e.g., powder coating) for corrosion resistance and/or aesthetic purposes. In one embodiment, the housing 525 may be made of or covered with wicker, for example. In one embodiment, the housing 525 may include a drawer or similar enclosed or partially enclosed portion for receiving and storing objects, such as a remote control, and, in one embodiment, may further function as a cooler for storing cold beverages, for example.

In one embodiment, the side walls 536 may be integrally formed with and bent from ends of the front wall 532, and the rear wall 534 may be attached to the side walls 536 via welding, fasteners, or any other suitable device. For example, in one embodiment, the side walls 536 include respective flanges 537 to which the rear wall 534 may be riveted. Similarly, the bottom wall 538 may be attached to the front, rear, and side walls 532, 534, 536 via welding, fasteners, or any other suitable device. Of course, the housing 525 according to embodiments of the present invention is not limited to the above-described structure. For example, in another embodiment, the side walls 536 may be formed separately from and subsequently attached to the front wall 532.

The housing 525 may include one or more stiffeners 545. In one embodiment, the stiffeners 545 include a pair of horizontal bands (i.e. strongbacks) extending across the rear wall 534. In one embodiment, the stiffeners 545 are aligned with mounting locations of the lift device 570 on the rear wall 534. However, embodiments of the present invention are not limited thereto, and in other embodiments, the housing 525 may include any suitable stiffening device or combination thereof for providing strength and rigidity to the housing 525, including, but not limited to, ribs, flanges, and/or channels.

The cover 550, in one embodiment, is substantially similar to the cover 50 described above and includes a substantially flat panel having a lower surface which abuts an upper surface of the housing 525 when the television is in the storage position. In one embodiment, the cover 550 further includes a flange around a periphery thereof for sealing the opening of the housing 525. The flange may extend downward over the housing 525 for preventing precipitation or dust from entering through the opening of the housing 525. The cover 550, in one embodiment, may be formed of galvanized steel (e.g., sheet metal), but in other embodiments, may be formed of stainless steel, aluminum, plastic, fiberglass, ceramic, or any other suitable material. Further, the cover 550 may have any suitable coating or finish (e.g., powder coating) for corrosion resistance and/or aesthetic purposes. In one embodiment, the cover 550 may be made of or covered with wicker, for example. Further, in one embodiment, the cover 550 may be lockable to the housing 525 in the sealing position, as may be desirable during long periods of storage, for example.

In one embodiment, the enclosure 520 may further include a hat channel 555 connected between a lower surface of the cover 550 and the lift device 570. For example, the hat channel 555 may include a base portion 556 attached to the lift device 570, and at least one offset portion 557 spaced apart in an upward direction from the base portion 556. The offset portion 557 is attached to and raises the lower surface of the cover 550 relative to an upper surface of the lift device 570 to ensure that the cover 550 engages and seals the housing 525. For example, the offset portion 557 may have a flanged structure. Further, the hat channel 555 may have fastener holes 558 formed in the base portion 556 and/or the offset portion 557 for attaching the hat Channel 555 to the cover 550.

In one embodiment, the enclosure 520 includes a gasket 560 attached at an upper end of the housing 525 at the opening, and which contacts the cover 550 for providing a weatherproof seal therebetween when the cover 550 engages the housing 525. The gasket 560 may be formed of a rubber or other sealing material suitable for outdoor use.

The housing 525 is configured to be mounted to the trolley 580 and, in one embodiment, includes support members 539 to connect the trolley 580 to the bottom plate 538, such as via fasteners.

Figure 15:
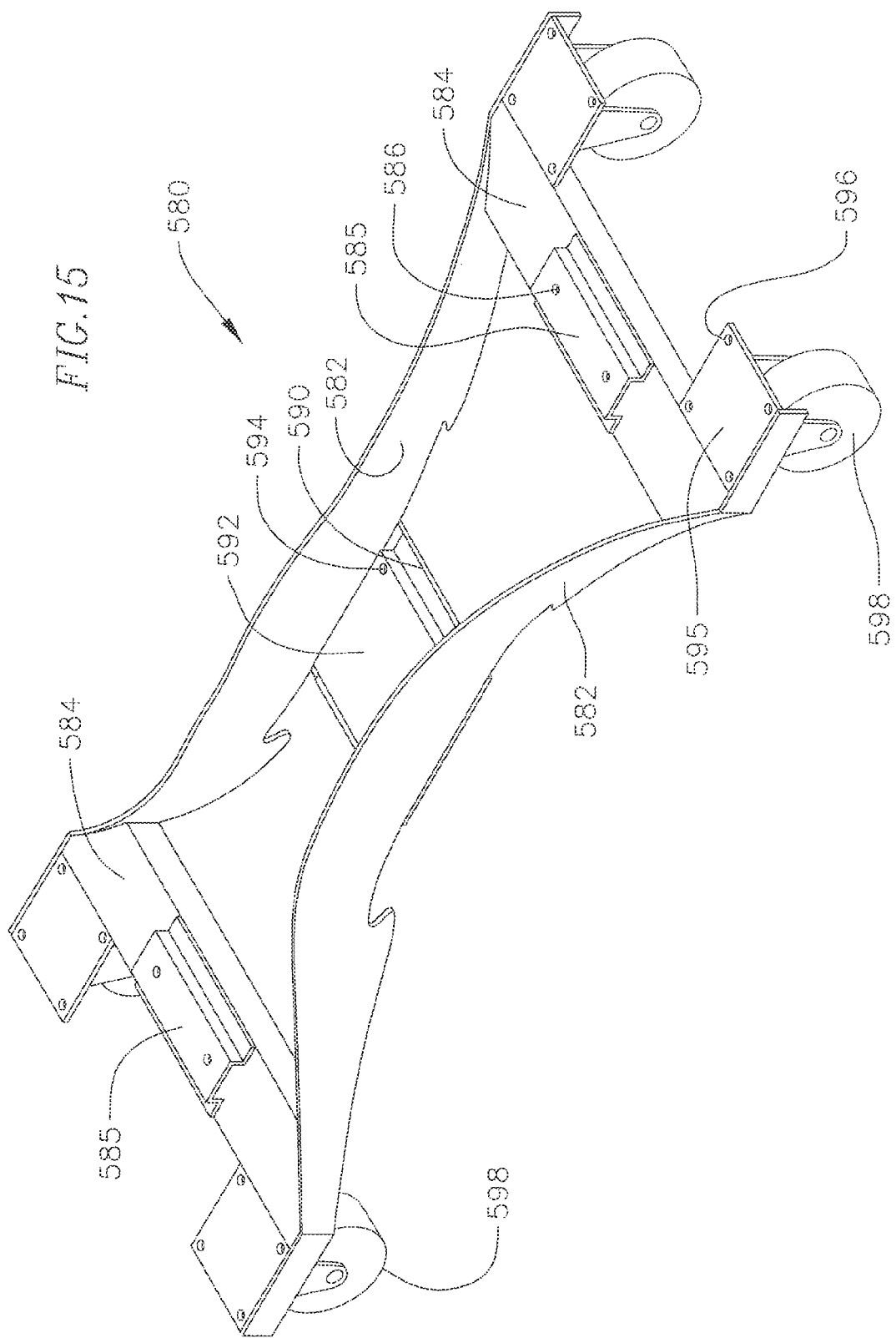
FIG. 15 is a perspective view of a trolley of the television lift assembly of FIG. 12.

With reference to FIG. 15, the trolley 580 according to one embodiment of the present invention includes a pair of side rails 582 and a pair of end members 584 connecting the side rails 582 to each other. In one embodiment, each of the end members 584 has an end support member 585 having fastener holes 586 formed therein for mounting and fixing the housing 525 thereto. The trolley 580, in one embodiment, further includes a center plate 590 connected between the side rails 582 to increase the rigidity and strength of the trolley 580. The center plate 590, in one embodiment, has a center support member 592 for supporting the housing 525 and may also have fastener holes 594 formed therein for fastening the housing 525 to the center support member 592. The trolley 580, in one embodiment, further includes caster plates 595 connected to respective ones of one or both of the side rails 582 and the end members 584. The trolley 580 may be formed of stainless steel, galvanized steel (e.g., sheet metal having a suitable coating), or any other suitable material. Further, the trolley 580 includes a plurality of casters 598, or any other suitable device, for moving the television lift assembly 500. The casters 598 may be mounted to respective bottom surfaces of the caster plates 595 and attached thereto via fasteners extending through fastener holes 596 formed in the caster plates 595, or any other suitable fastening devices. In one embodiment, for example, the casters 598 may be multi-directional casters manufactured by Rotacaster Wheel Limited (e.g., Model No. R-2125-9510) for facilitating stability and safe movement of the television lift assembly 500. While shown and described above in connection with the television lift assembly 500, the trolley 580 may be used and/or combined with any of the media apparatuses or television lift assemblies according to embodiments of the present invention for improving movability thereof.

Figure 16:
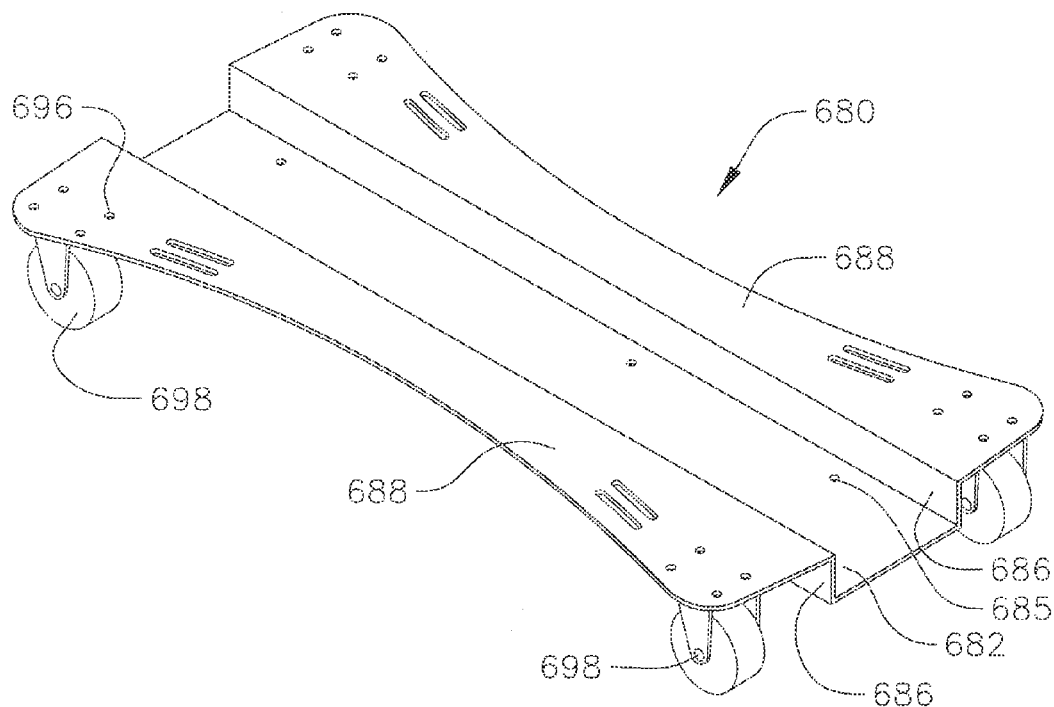
FIG. 16 is a perspective view of a trolley of a television lift assembly according to another embodiment of the present invention.
Figure 17:
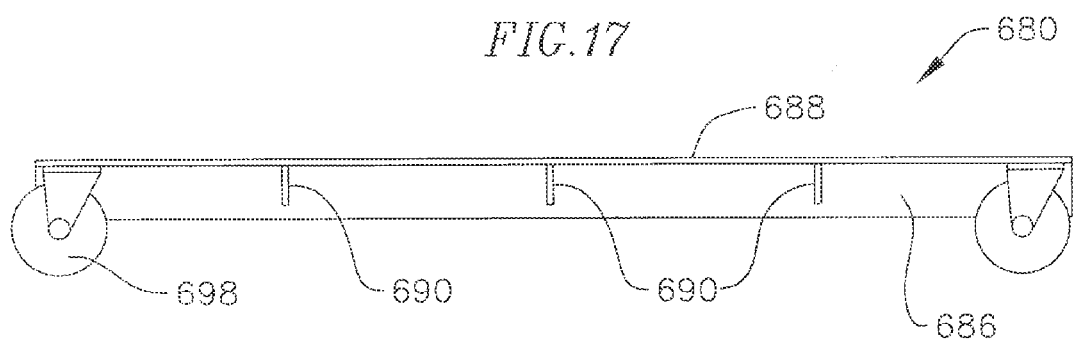
FIG. 17 is a front view of the trolley of a television lift assembly of FIG. 16.
Figure 18:
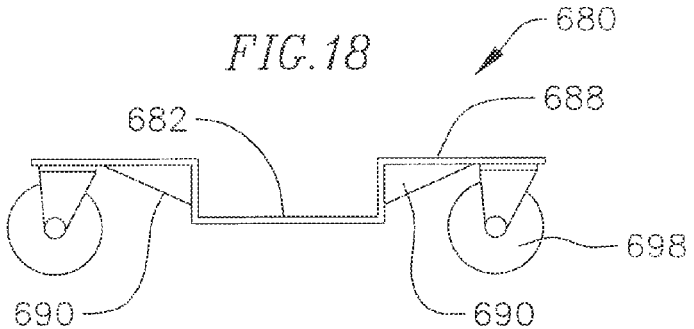
FIG. 18 is a side view of the trolley of a television lift assembly of FIG. 16.

With reference to FIGS. 16-18, a trolley 680 according to another embodiment of the present invention includes a base plate 682 having a plurality of fastener holes 685 for mounting and fixing a television lift assembly, such as a television lift assembly described above, to the base plate 682. The trolley 680 further includes two side walls 686 extending upward from opposite sides of the base plate 682, and two upper flanges 688 extending outward from the respective side walls 686. The trolley 680, in one embodiment, further includes one or more gussets 690 (see FIGS. 17 and 18) arranged between each of the side walls 686 and the respective upper flanges 688 to increase the rigidity and strength of the trolley 680. The trolley 680 may be formed of stainless steel, galvanized steel (e.g., sheet metal having a suitable coating), or any other suitable material. Further, the trolley 680 includes a plurality of casters 698, or any other suitable device, for moving the trolley 680 having a television lift assembly mounted thereon. The casters 698 may be mounted to respective bottom surfaces of the upper flanges 688 and attached thereto via fasteners extending through fastener holes 696 formed in the upper flanges 688, or any other suitable fastening devices. In one embodiment, for example, the casters 698 may be multi-directional casters manufactured by Rotacaster Wheel Limited (e.g., Model No. R-2125-9510) for facilitating stability and safe movement of the trolley 680 having a television lift assembly mounted thereon. The trolley 680 may be used and/or combined with any of the media apparatuses or television lift assemblies according to embodiments of the present invention for improving movability thereof.

Figure 19:
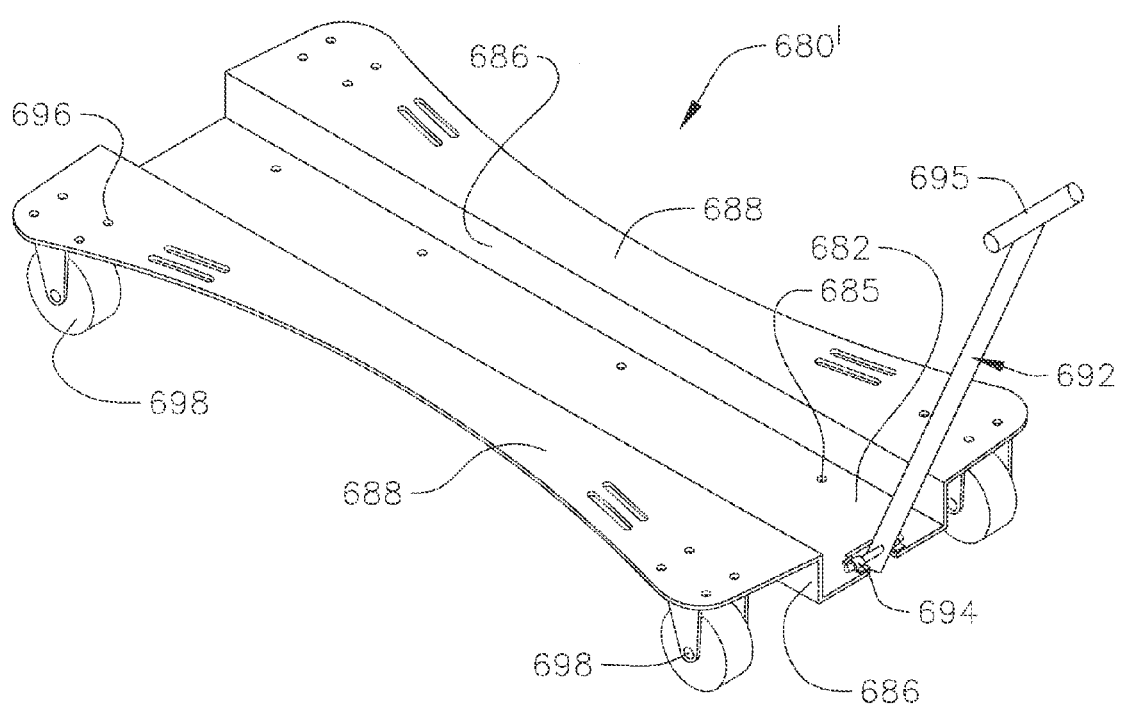
FIG. 19 is a perspective view of a trolley of a television lift assembly according to another embodiment of the present invention.

With reference to FIG. 19, a trolley 680' according to another embodiment of the present invention is similar to the trolley 680 described above and shown in FIGS. 16-18 except that the trolley 680' further includes a handle 692 to facilitate moving the trolley 680'. In one embodiment, the handle 692 is rotatably coupled to the base plate 682 at a coupling portion 694. The handle 692 further includes a handle portion 695 connected to the coupling portion 694 such that the handle portion 695 is rotatable relative to the base plate 682 and configured to be grasped and pulled, and to be rotated to an upright position to be compact when not being pulled. While the handle 692 is shown on the trolley 680' that is similar to the trolley 680, the trolley 580 described above and shown in FIG. 15 may also be configured having a handle, such as the handle 692. Further, in another embodiment, any of the trolleys described herein may have three casters instead of four casters.

With reference to FIG. 20, a media system 700 according to another embodiment of the present invention includes a plurality of media apparatuses 710 integrated to one another through a control device 715. In one embodiment, a viewing area 720 may be formed between the media apparatuses 710, within which respective televisions of one or more of the media apparatuses 710 are viewable. Further, in one embodiment, each of the media apparatuses 710 is controllable separately or together with one or more of the other media apparatuses 710 through the control device 715. For example, the control device 715 may be electrically connected to each of the media apparatuses 710 and configured to operate a respective lift device or control a respective television of one or more of the media apparatuses 710. In one embodiment, the control device 715 may include a wireless remote control device configured to operate one or more of the media apparatuses 710 together or individually. Further, in one embodiment, the control device 715 may include or be connected to a media player or an audio system that is operable with one or more of the media apparatuses 710. The media apparatuses 710 may be the same or similar to the media apparatus 10 described above and shown in FIGS. 1-3, or may be media apparatuses including any of the other television lift assemblies described herein, for example.

With reference to FIG. 21, a media apparatus 800 according to another embodiment of the present invention includes two televisions 811, an enclosure 820 including a housing 825 and a cover 850, and a lift device 870. The media apparatus 800 is configured to house the two television 811 in the same weatherproof enclosure 820 in a storage position when the televisions 811 are not being viewed, and lift the televisions 811 out from the enclosure 820 to a viewing position in which the television 811 may be viewed. Further, in one embodiment, the televisions 811 may both be attached to the same lift device 870 such that, when in the viewing position, screens of the pair of televisions 811 face in opposite directions.

Although the drawings and accompanying description illustrate some exemplary embodiments of a weatherproof television lift and enclosure, it will be apparent that the novel aspects of the present invention may also be carried out by utilizing alternative structures, sizes, shapes, and/or materials in embodiments of the present invention. For example, in one alternative embodiment, a television lift assembly may include a lift mechanism other than the lift device shown and described herein. In another alternative embodiment, a television (e.g., a widescreen television) may be mounted with a wide side being vertical, that is, in a "portrait" arrangement rather than a "landscape" arrangement. For example, a television lift assembly according to another embodiment of the present invention may include a hydraulic or pneumatic actuator, or any other suitable mechanism or device for moving a television between the storage position and the viewing position, as described above. Also, for example, in other embodiments, components described above may be interchanged with those of other embodiments. For example, the enclosure 420 described above and shown in FIG. 11 may be substituted for the enclosure 20 in the media apparatus 10 described with respect to FIGS. 1-3.

The preceding description has been presented with reference to various embodiments of the invention. Persons skilled in the art and technology to which this invention pertains will appreciate that alterations and changes in the described structures and methods of operation can be practiced without meaningfully departing from the principles, spirit, and scope of this invention.

What is claimed is:
1. A television lift assembly comprising:
an enclosure comprising:
a housing having an opening and comprising a mounting wall extending in a vertical direction; and
a cover engageable with the housing to seal and weatherproof the opening;
a lift device comprising a first portion mounted in the enclosure, and a movable portion comprising a first end movably coupled to the first portion, an attachment portion configured to removably attach a television thereto, and a second end, the cover being fixedly attached to the second end;
a channel portion fixedly attaching the cover to the second end of the movable portion, the channel portion comprising a base portion fixedly attached to the second end, a pair of channel walls extending in the vertical direction from the base portion, and offset portions, each extending perpendicularly from a respective one of the channel walls and being fixedly attached to the cover; and
at least one of a pressure sensor or a capacitance sensor to detect a hand contacting at least one of the cover or the housing,
wherein the movable portion of the lift device is movable in the vertical direction between a first position within the housing and in which the cover seals and weatherproofs the opening and a second position outside the housing.
2. The television lift assembly of claim 1, further comprising an adapter plate attached to the attachment portion of the lift device and configured to removably attach any of a plurality of televisions having different sizes to the attachment portion.

3. The television lift assembly of claim 2, wherein the adapter plate has a plurality of attachment holes spaced apart from one another in the vertical direction for adjusting a position of the television relative to the attachment portion in the vertical direction.

4. The television lift assembly of claim 3, further comprising a mounting plate connected to the adapter plate and configured to removably attach the television thereto, wherein a position of the mounting plate relative to the attachment portion is adjustable in a horizontal direction.

5. The television lift assembly of claim 1, wherein the housing comprises a flange surrounding and extending away from the opening.

6. The television lift assembly of claim 5, further comprising a gasket attached to one of the flange or the cover, wherein the gasket contacts the other of the flange or the cover to weatherproof the enclosure when the movable portion of the lift device is in the first position.

7. The television lift assembly of claim 5, wherein the cover comprises a flange around a periphery thereof, the flange of the cover surrounding the flange of the housing when the cover is engaged with the housing.

8. The television lift assembly of claim 1, wherein the housing comprises a mounting device configured to mount the housing to a structure.

9. The television lift assembly of claim 1, further comprising a trolley connected to and movably supporting the housing.

10. The television lift assembly of claim 1, further comprising a controller to at least one of stop or reverse a direction of movement of the movable portion of the lift device when the hand is detected by the sensor.

11. The television lift assembly of claim 1, further comprising a graphic display on an exterior surface of the housing.

12. The television lift assembly of claim 1, wherein the first portion of the lift device is fixedly attached to the mounting wall of the housing.

13. A media apparatus for outdoor use, the media apparatus comprising:
  an enclosure comprising:
    a housing having an opening and comprising a mounting wall extending in a vertical direction; and
    a cover engageable with the housing to seal and weatherproof the opening,
  a lift device comprising a first portion mounted in the enclosure, and a movable portion comprising a first end movably coupled to the first portion, an attachment portion, and a second end, the cover being fixedly attached to the second end;
  a channel portion fixedly attaching the cover to the second end of the movable portion, the channel portion comprising a base portion fixedly attached to the second end, a pair of channel walls extending in the vertical direction from the base portion, and offset portions, each extending perpendicularly from a respective one of the channel walls and being fixedly attached to be cover;
  at least one of a pressure sensor or a capacitance sensor to detect an obstruction contacting at least one of the cover or the housing; and
  a television removably attached to the attachment portion of the lift device,
  wherein the movable portion of the lift device is movable in the vertical direction between a first position in which the television is inside the housing and the cover seals and weatherproofs the opening and a second position in which the television is outside the housing.

14. The media apparatus of claim 13, further comprising an adapter plate attached to the attachment portion of the lift device and configured to removably attach any of a plurality of televisions having different sizes to the attachment portion.

15. The media apparatus of claim 14, wherein the adapter plate has a plurality of attachment holes spaced apart from one another in the vertical direction for adjusting a position of the television relative to the attachment portion in the vertical direction.

16. The media apparatus of claim 13, further comprising a mounting plate connected to the attachment portion, the television being removably attached to the mounting plate, wherein a vertical centerline of the mounting plate is offset to one side in a horizontal direction relative to a vertical centerline of the lift device.

17. The media apparatus of claim 13, further comprising a gasket attached to one of the housing or the cover, wherein the gasket contacts the other of the housing or the cover to weatherproof the enclosure when the movable portion of the lift device is in the first position.

18. The media apparatus of claim 13, further comprising a controller to at least one of stop or reverse a direction of movement of the movable portion of the lift device when the obstruction is detected by the sensor.

19. The media apparatus of claim 13, further comprising a media player mounted to the movable portion of the lift device, the media player being movable together with the movable portion of the lift device between a position inside the housing and another position outside the housing.

20. The media apparatus of claim 13, further comprising a weatherproof audio speaker integrated on the housing.

21. The media apparatus of claim 13, wherein the television is not substantially enclosed when the movable portion of the lift device is in the second position.

22. The media apparatus of claim 13, wherein a screen of the television is not covered when the movable portion of the lift device is in the second position.

23. The media apparatus of claim 13, wherein the lift device is operable via a remote control device.

24. The media apparatus of claim 13, wherein the first portion of the lift device is fixedly attached to the mounting wall of the housing.

* * * * *